US008001219B2

(12) United States Patent
Moorer et al.

(10) Patent No.: US 8,001,219 B2
(45) Date of Patent: Aug. 16, 2011

(54) USER CONTROL INTERFACE FOR CONVERGENCE AND AUTOMATION SYSTEM

(75) Inventors: Seale Moorer, Westerville, OH (US);
Eric Eichensehr, Westerville, OH (US)

(73) Assignee: Exceptional Innovation, LLC, Westerville, OH (US)

( * ) Notice: Subject to any disclaimer, the term of this patent is extended or adjusted under 35 U.S.C. 154(b) by 882 days.

(21) Appl. No.: 11/686,893

(22) Filed: Mar. 15, 2007

(65) Prior Publication Data

US 2007/0241945 A1   Oct. 18, 2007

Related U.S. Application Data

(60) Provisional application No. 60/782,734, filed on Mar. 16, 2006, provisional application No. 60/782,598, filed on Mar. 16, 2006, provisional application No. 60/782,635, filed on Mar. 16, 2006, provisional application No. 60/782,596, filed on Mar. 16, 2006, provisional application No. 60/782,599, filed on Mar. 16, 2006, provisional application No. 60/782,600, filed on Mar. 16, 2006, provisional application No. 60/782,634, filed on Mar. 16, 2006, provisional application No. 60/782,595, filed on Mar. 16, 2006, provisional application No. 60/785,275, filed on Mar. 24, 2006, provisional application No. 60/793,257, filed on Apr. 20, 2006, provisional application No. 60/747,726, filed on May 19, 2006, provisional application No. 60/746,287, filed on May 3, 2006, provisional application No. 60/786,119, filed on Mar. 27, 2006, provisional application No. 60/857,774, filed on Nov. 9, 2006.

(51) Int. Cl.
*G06F 15/16* (2006.01)
*G06F 15/177* (2006.01)
*G05B 11/01* (2006.01)
*G05B 19/42* (2006.01)

(52) U.S. Cl. ............. 709/220; 709/203; 700/19; 700/87

(58) Field of Classification Search .................. 709/220, 709/203; 700/19, 87
See application file for complete search history.

(56) References Cited

U.S. PATENT DOCUMENTS

| 4,567,557 A | 1/1986 | Burns |
| 4,808,841 A | 2/1989 | Ito et al. |
| 4,989,081 A | 1/1991 | Miyagawa |

(Continued)

OTHER PUBLICATIONS

Fred Halsall; Data Communications, Computer Networks and Open Systems; 1996; Addison-Wesley Publishers Ltd.; Fourth Edition; pp. 15, 18.

*Primary Examiner* — Wing F Chan
*Assistant Examiner* — David X Yi
(74) *Attorney, Agent, or Firm* — McGuireWoods LLP

(57) ABSTRACT

A convergence and automation system includes (a) an internet-protocol based (IP) network implemented with a web service for devices (WSD) protocol, (b) a plurality of devices connected to the network, wherein each device is configured to perform at least one service, (c) a server implemented with the WSD protocol, connected to the network and configured to control the devices for converging and automating the services thereof, and (d) at least one client implemented with the WSD protocol, connected to the network and configured to control at least a portion of the services of the devices. One of the server and the at least one client is configured to establish communication with the devices and further configured with a control panel application allowing a user to configure and test the convergence and automation system.

14 Claims, 35 Drawing Sheets

U.S. PATENT DOCUMENTS

| | | |
|---|---|---|
| 5,086,385 A | 2/1992 | Launey et al. |
| 5,105,186 A | 4/1992 | May |
| 5,218,552 A | 6/1993 | Stirk |
| 5,237,305 A | 8/1993 | Ishijuro |
| 5,282,028 A | 1/1994 | Johnson et al. |
| 5,502,618 A | 3/1996 | Chiou |
| 5,565,894 A | 10/1996 | Bates et al. |
| 5,579,221 A | 11/1996 | Mun |
| 5,598,523 A | 1/1997 | Fujita |
| 5,621,662 A | 4/1997 | Humphries et al. |
| 5,623,392 A | 4/1997 | Ma |
| 5,666,172 A | 9/1997 | Ida et al. |
| 5,706,191 A | 1/1998 | Bassett et al. |
| 5,706,290 A | 1/1998 | Shaw et al. |
| 5,748,444 A | 5/1998 | Honda et al. |
| 5,787,259 A | 7/1998 | Haroun |
| 5,831,823 A | 11/1998 | Hoedl |
| 5,850,340 A | 12/1998 | York |
| 5,877,957 A | 3/1999 | Bennett |
| 5,922,047 A | 7/1999 | Newlin et al. |
| 5,956,025 A | 9/1999 | Goulden et al. |
| 6,020,881 A | 2/2000 | Naughton et al. |
| 6,029,092 A | 2/2000 | Stein |
| 6,061,602 A | 5/2000 | Meyer |
| 6,112,127 A | 8/2000 | Bennett |
| 6,139,177 A | 10/2000 | Venkatraman et al. |
| 6,147,601 A | 11/2000 | Sandelman et al. |
| 6,154,681 A | 11/2000 | Drees et al. |
| 6,160,477 A | 12/2000 | Sandelman et al. |
| 6,175,872 B1 | 1/2001 | Neumann et al. |
| 6,182,094 B1 | 1/2001 | Humpleman et al. |
| 6,192,282 B1 | 2/2001 | Smith et al. |
| 6,198,479 B1 | 3/2001 | Humpleman et al. |
| 6,201,523 B1 | 3/2001 | Akiyama et al. |
| 6,222,729 B1 | 4/2001 | Yoshikawa |
| 6,243,707 B1 | 6/2001 | Humpleman et al. |
| 6,263,260 B1 | 7/2001 | Bodmer et al. |
| 6,268,857 B1 | 7/2001 | Fishkin et al. |
| 6,275,922 B1 | 8/2001 | Bertsch |
| 6,278,676 B1 | 8/2001 | Anderson et al. |
| 6,288,716 B1 | 9/2001 | Humpleman et al. |
| 6,313,990 B1 | 11/2001 | Cheon |
| 6,314,326 B1 | 11/2001 | Fuchu |
| 6,353,853 B1 | 3/2002 | Gravlin |
| 6,385,495 B1 | 5/2002 | Bennett |
| 6,389,331 B1 | 5/2002 | Jensen et al. |
| 6,402,109 B1 | 6/2002 | Dittmer |
| 6,405,103 B1 | 6/2002 | Ryan et al. |
| 6,456,892 B1 | 9/2002 | Dara-Abrams et al. |
| 6,462,654 B1 | 10/2002 | Sandelman et al. |
| 6,473,661 B1 | 10/2002 | Wollner |
| 6,496,575 B1 | 12/2002 | Vasell et al. |
| 6,522,346 B1 | 2/2003 | Meyer |
| 6,523,696 B1 | 2/2003 | Saito et al. |
| 6,526,581 B1 | 2/2003 | Edson |
| 6,546,419 B1 | 4/2003 | Humpleman |
| 6,580,950 B1 | 6/2003 | Johnson et al. |
| 6,587,739 B1 | 7/2003 | Abrams et al. |
| 6,609,038 B1 | 8/2003 | Croswell et al. |
| 6,615,088 B1 | 9/2003 | Myer et al. |
| 6,633,781 B1 | 10/2003 | Lee et al. |
| 6,640,141 B2 | 10/2003 | Bennett |
| 6,663,781 B1 | 12/2003 | Huling |
| 6,690,411 B2 | 2/2004 | Naidoo et al. |
| 6,690,979 B1 | 2/2004 | Smith |
| 6,735,619 B1 | 5/2004 | Sawada |
| 6,756,998 B1 | 6/2004 | Bilger |
| 6,763,040 B1 | 7/2004 | Hite et al. |
| 6,778,868 B2 | 8/2004 | Imamura et al. |
| 6,782,294 B2 | 8/2004 | Reich et al. |
| 6,792,319 B1 | 9/2004 | Bilger |
| 6,792,323 B2 | 9/2004 | Krzyzanowski et al. |
| 6,792,480 B2 | 9/2004 | Chaiken et al. |
| 6,823,223 B2 | 11/2004 | Gonzales et al. |
| 6,834,208 B2 | 12/2004 | Gonzales et al. |
| 6,838,978 B2 | 1/2005 | Aizu et al. |
| 6,845,275 B2 | 1/2005 | Gasiorek et al. |
| 6,850,149 B2 | 2/2005 | Park |
| 6,859,669 B2 | 2/2005 | An |
| 6,865,428 B2 | 3/2005 | Gonzales et al. |
| 6,868,292 B2 | 3/2005 | Ficco |
| 6,868,293 B1 | 3/2005 | Schurr et al. |
| 6,870,555 B2 | 3/2005 | Sekiguchi |
| 6,891,838 B1 | 5/2005 | Petite |
| 6,909,921 B1 | 6/2005 | Bilger |
| 6,912,429 B1 | 6/2005 | Bilger |
| 6,924,727 B2 | 8/2005 | Nagaoka et al. |
| 6,928,576 B2 | 8/2005 | Sekiguchi |
| 6,930,599 B2 | 8/2005 | Naidoo et al. |
| 6,957,110 B2 | 10/2005 | Wewalaarachchi et al. |
| 6,957,275 B1 | 10/2005 | Sekiguchi |
| 6,961,763 B1 | 11/2005 | Wang et al. |
| 6,965,935 B2 | 11/2005 | Diong |
| 6,967,565 B2 | 11/2005 | Lingermann |
| 6,980,868 B2 | 12/2005 | Huang et al. |
| 6,990,379 B2 | 1/2006 | Gonzales et al. |
| 7,047,092 B2 | 5/2006 | Wimsatt |
| 7,130,719 B2 | 10/2006 | Ehlers et al. |
| 7,136,709 B2 | 11/2006 | Arling |
| 7,170,422 B2 | 1/2007 | Nelson et al. |
| 7,174,385 B2 | 2/2007 | Li |
| 7,200,683 B1 | 4/2007 | Wang et al. |
| 7,201,356 B2 | 4/2007 | Huang |
| 7,203,486 B2 | 4/2007 | Patel |
| 7,225,037 B2 | 5/2007 | Shani |
| 7,260,604 B2 | 8/2007 | Kuki |
| 7,370,280 B2 | 5/2008 | Ho et al. |
| 7,380,250 B2 | 5/2008 | Schechter et al. |
| 7,453,685 B2 | 11/2008 | Lube |
| 7,505,889 B2 | 3/2009 | Salmonsen |
| 2001/0034754 A1 | 10/2001 | Elwahab et al. |
| 2001/0036192 A1 | 11/2001 | Chiles et al. |
| 2001/0039460 A1 | 11/2001 | Aisa |
| 2002/0000092 A1 | 1/2002 | Sharood et al. |
| 2002/0016639 A1* | 2/2002 | Smith et al. ........................ 700/9 |
| 2002/0029085 A1 | 3/2002 | Park |
| 2002/0031120 A1 | 3/2002 | Rakib |
| 2002/0033760 A1 | 3/2002 | Kobayashi |
| 2002/0035404 A1 | 3/2002 | Ficco et al. |
| 2002/0044042 A1 | 4/2002 | Christensen |
| 2002/0047774 A1 | 4/2002 | Christensen |
| 2002/0111698 A1 | 8/2002 | Graziano et al. |
| 2002/0126443 A1 | 9/2002 | Zodnik |
| 2002/0152311 A1 | 10/2002 | Veltman et al. |
| 2002/0165953 A1 | 11/2002 | Diong |
| 2002/0174178 A1 | 11/2002 | Stawikowski |
| 2002/0180579 A1 | 12/2002 | Nagaoka et al. |
| 2002/0194328 A1 | 12/2002 | Hallenbeck |
| 2002/0196158 A1 | 12/2002 | Lee |
| 2003/0009515 A1 | 1/2003 | Lee et al. |
| 2003/0009537 A1 | 1/2003 | Wang |
| 2003/0028270 A1 | 2/2003 | Peterson et al. |
| 2003/0033028 A1 | 2/2003 | Bennett |
| 2003/0034898 A1 | 2/2003 | Shamoon et al. |
| 2003/0037166 A1 | 2/2003 | Ueno et al. |
| 2003/0040812 A1 | 2/2003 | Gonzales et al. |
| 2003/0040813 A1 | 2/2003 | Gonzales et al. |
| 2003/0040819 A1 | 2/2003 | Gonzales |
| 2003/0065407 A1 | 4/2003 | Johnson et al. |
| 2003/0069887 A1 | 4/2003 | Lucovsky et al. |
| 2003/0074088 A1 | 4/2003 | Gonzales |
| 2003/0083758 A1 | 5/2003 | Williamson |
| 2003/0101304 A1 | 5/2003 | King et al. |
| 2003/0103088 A1 | 6/2003 | Dresti et al. |
| 2003/0198938 A1 | 10/2003 | Murray |
| 2003/0200009 A1 | 10/2003 | von Kannewurff |
| 2003/0233432 A1 | 12/2003 | Davis et al. |
| 2004/0003051 A1 | 1/2004 | Krzyzanowski et al. |
| 2004/0004810 A1 | 1/2004 | Kim |
| 2004/0010327 A1 | 1/2004 | Terashima et al. |
| 2004/0010561 A1 | 1/2004 | Kim |
| 2004/0039459 A1 | 2/2004 | Daugherty et al. |
| 2004/0092282 A1 | 5/2004 | Kim et al. |
| 2004/0133314 A1 | 7/2004 | Ehlers |
| 2004/0138768 A1 | 7/2004 | Murray |
| 2004/0143629 A1 | 7/2004 | Bodin et al. |
| 2004/0176877 A1 | 9/2004 | Hesse |

| | | | | | | |
|---|---|---|---|---|---|---|
| 2004/0213384 A1 | 10/2004 | Alles | | 2005/0131553 A1 | 6/2005 | Yoon et al. |
| 2004/0215694 A1 | 10/2004 | Podolsky | | 2005/0131558 A1 | 6/2005 | Braithwaite |
| 2004/0215778 A1* | 10/2004 | Hesse et al. ............ 709/226 | | 2005/0132405 A1 | 6/2005 | AbiEzzi |
| 2004/0215816 A1 | 10/2004 | Hayes et al. | | 2005/0149758 A1 | 7/2005 | Park |
| 2004/0237107 A1 | 11/2004 | Staples | | 2005/0159823 A1 | 7/2005 | Hayes et al. |
| 2004/0243257 A1 | 12/2004 | Theimer | | 2005/0198063 A1 | 9/2005 | Thomas et al. |
| 2004/0249922 A1 | 12/2004 | Hackman | | 2005/0198188 A1 | 9/2005 | Hickman |
| 2004/0260407 A1 | 12/2004 | Wimsatt | | 2005/0198304 A1 | 9/2005 | Oliver et al. |
| 2004/0260427 A1 | 12/2004 | Wimsatt | | 2005/0232583 A1 | 10/2005 | Kubota |
| 2004/0266439 A1 | 12/2004 | Lynch et al. | | 2005/0262227 A1 | 11/2005 | Heller et al. |
| 2004/0267385 A1 | 12/2004 | Lingemann | | 2005/0267605 A1 | 12/2005 | Lee et al. |
| 2004/0267876 A1 | 12/2004 | Kakivaya et al. | | 2005/0271355 A1 | 12/2005 | Gilor |
| 2004/0267909 A1 | 12/2004 | Autret | | 2006/0004920 A1 | 1/2006 | Hallenbeck |
| 2005/0009498 A1 | 1/2005 | Ho | | 2006/0009861 A1 | 1/2006 | Bonasia et al. |
| 2005/0021805 A1 | 1/2005 | De Petris et al. | | 2006/0020353 A1 | 1/2006 | Gonzales et al. |
| 2005/0035717 A1 | 2/2005 | Adamson | | 2006/0053234 A1 | 3/2006 | Kumar et al. |
| 2005/0038708 A1 | 2/2005 | Wu | | 2006/0058900 A1 | 3/2006 | Johanson et al. |
| 2005/0055108 A1 | 3/2005 | Gonzales | | 2006/0069934 A1 | 3/2006 | Esch et al. |
| 2005/0071419 A1 | 3/2005 | Lewontin | | 2006/0106933 A1 | 5/2006 | Huang et al. |
| 2005/0080879 A1 | 4/2005 | Kim et al. | | 2006/0118694 A1 | 6/2006 | Lee et al. |
| 2005/0085930 A1 | 4/2005 | Gonzales | | 2006/0126646 A1 | 6/2006 | Bedingfield, Sr. |
| 2005/0090915 A1 | 4/2005 | Geiwitz | | 2006/0155802 A1 | 7/2006 | He et al. |
| 2005/0096753 A1 | 5/2005 | Arling et al. | | 2007/0053376 A1 | 3/2007 | Oshima et al. |
| 2005/0107897 A1 | 5/2005 | Callaghan | | 2007/0073419 A1 | 3/2007 | Sesay |
| 2005/0108091 A1 | 5/2005 | Sotak | | 2007/0083679 A1 | 4/2007 | Kikuchi |
| 2005/0113021 A1 | 5/2005 | Gosieski, Jr. et al. | | 2007/0104332 A1 | 5/2007 | Clemens et al. |
| 2005/0113943 A1 | 5/2005 | Nian | | 2007/0153459 A1 | 7/2007 | Wohlford et al. |
| 2005/0119767 A1 | 6/2005 | Kiwimagi et al. | | 2007/0162567 A1* | 7/2007 | Ding ............ 709/219 |
| 2005/0119793 A1 | 6/2005 | Amundson et al. | | 2007/0247800 A1 | 10/2007 | Smith et al. |
| 2005/0125083 A1 | 6/2005 | Kiko | | 2008/0108439 A1 | 5/2008 | Cole |
| 2005/0131551 A1 | 6/2005 | Ruutu | | | | |

* cited by examiner

| Script | | | Schedule |
|---|---|---|---|
| Component | Action | | Daily at 7:00 a.m. |
| Light | Ramps up to 100% | | |
| Audio | Plays music at present volume | | |
| Thermostat | Sets to 70° F | | |

# USER CONTROL INTERFACE FOR CONVERGENCE AND AUTOMATION SYSTEM

CROSS REFERENCE TO RELATED APPLICATION

This application claims priority to and the benefit of; Provisional Patent Application No. 60/782,734 filed on Mar. 16, 2006, entitled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTIONS, AND EVENTING THAT IS CONTROLLABLE WITH A TOUCH-SCREEN DISPLAY, to Seale MOORER et al.; Provisional Patent Application No. 60/782,596 filed on Mar. 16, 2006, entitled AUTOMATION CONTROL SYSTEM HAVING DIGITAL MEDIA STREAMING, to Seale MOORER et al.; Provisional Patent Application No. 60/782,598 filed on Mar. 16, 2006, entitled AUTOMATION CONTROL SYSTEM HAVING DIGITAL LOGGING, to Seale MOORER et al.; Provisional Patent Application No. 60/782,635 filed on Mar. 16, 2006, entitled AUTOMATION CONTROL SYSTEM HAVING A CONTROL PANEL, to Seale MOORER et al.; Provisional Patent Application No. 60/782,599 filed on Mar. 16, 2006, entitled AUTOMATION CONTROL SYSTEM HAVING A CONFIGURATION TOOL, to Seale MOORER et al.; Provisional Patent Application No. 60/782,600 filed on Mar. 16, 2006, entitled AUTOMATION CONTROL SYSTEM HAVING DEVICE SCRIPTING, to Seale MOORER et al.; Provisional Patent Application No. 60/782,634 filed on Mar. 16, 2006, entitled DEVICE AUTOMATION USING NETWORKED DEVICE CONTROL HAVING A WEB SERVICES FOR DEVICE STACK, to Seale MOORER et al.; Provisional Patent Application No. 60/782,595 filed on Mar. 16, 2006, entitled WIRELESS DIGITAL AMPLIFIER CONFIGURED FOR WALL MOUNTING, SHELF MOUNTING, AND THE LIKE, to Seale MOORER et al.; Provisional Patent Application No. 60/785,275 filed on Mar. 24, 2006, entitled AUTOMATION SYSTEM, to Seale MOORER et al.; Provisional Patent Application No. 60/793,257 filed on Apr. 20, 2006, entitled TOUCH SCREEN FOR USE WITH AUTOMATION SYSTEMS, to Seale MOORER et al.; Provisional Patent Application No. 60/747,726 filed on May 19, 2006, entitled COOLING DEVICE FOR A TOUCH SCREEN AND THE LIKE, to Seale MOORER et al.; Provisional Patent Application No. 60/746,287 filed on May 3, 2006, entitled HOME AUTOMATION SYSTEM AND THE LIKE, to Seale MOORER et al.; Provisional Patent Application No. 60/786,119 filed on Mar. 27, 2006, entitled HOME AUTOMATION PROGRAM CODE FOR SET TOP BOX OR SIMILAR CIRCUIT, to Steve CASHMAN; and Provisional Patent Application No. 60/857,774 filed Nov. 9, 2006, entitled PORTABLE MULTI-FUNCTIONAL MEDIA DEVICE, to Seale MOORER et al., all of which are hereby expressly incorporated by reference for all purposes as if fully set forth herein. Further, this application is related to the following U.S. Patent Applications: U.S. patent application Ser. No. 11/686,826, entitled NETWORK BASED DIGITAL ACCESS POINT DEVICE, filed Mar. 14, 2007, to Seale Moorer, et al.; U.S. patent application Ser. No. 11/686,836, entitled INTERNET PROTOCOL BASED MEDIA STREAMING SOLUTION, filed Mar. 15, 2007, to Seale Moorer, et al.; U.S. patent application Ser. No. 11/686,896, entitled AUTOMATION CONTROL SYSTEM HAVING A CONFIGURATION TOOL AND TWO-WAY ETHERNET COMMUNICATION FOR WEB SERVICE MESSAGING, DISCOVERY, DESCRIPTION, AND EVENTING THAT IS CONTROLLABLE WITH A TOUCH-SCREEN DISPLAY, filed Mar. 15, 2007 and issued on Mar. 24, 2009 as U.S. Pat. No. 7,509,402, to Seale Moorer, et al.; U.S. patent application Ser. No. 11/686,884, entitled AUTOMATION CONTROL SYSTEM HAVING DIGITAL LOGGING, filed Mar. 15, 2007 and issued on Feb. 24, 2009 as U.S. Pat. No. 7,496,627, to Seale Moorer, et al.; U.S. patent application Ser. No. 11/686,846, entitled DEVICE AUTOMATION USING NETWORKED DEVICE CONTROL HAVING A WEB SERVICES FOR DEVICES STACK, filed Mar. 15, 2007 and issued on Sep. 8, 2009 as U.S. Pat. No. 7,587,464, to Seale Moorer, et al.; U.S. patent application Ser. No. 11/686,875, entitled AUTOMATION CONTROL SYSTEM HAVING A CONFIGURATION TOOL, filed Mar. 15, 2007, to Seale Moorer, et al.; and U.S. patent application Ser. No. 11/686,889, entitled AUTOMATION CONTROL SYSTEM HAVING DEVICE SCRIPTING, filed Mar. 15, 2007, to Seale Moorer, et al., which are all hereby expressly incorporated by reference for all purposes as if fully set forth herein.

BACKGROUND OF THE INVENTION

1. Field of the Invention

The invention is directed to an automation convergence system user control interface, and more particularly to a user control interface using Web services for devices in an automation convergence system.

2. Related Art

Household, academic family and/or business spaces now more commonly have more than one audio or video device such as CD/DVD player, portable MP3 player, tuner, preamp, power amp, speakers, VCR, DVR, computers running media players or connected to some other source of audio or video (e.g., Internet radio, satellite radio and the like), etc. Typically, a CD/DVD player from one company comes with its own remote control and an amplifier by an entirely different company comes with its own remote control. The same space may have a PC with its keyboard and mouse, and yet another company's portable MP3 player with its own control switches. While each audio device is doing precisely what it was designed to do, each operates completely independent from the others with the possible exception of the portable MP3 player that may be connected to a PC for synchronization. As a result, a user ends up going from one keypad to another or juggling a series of remote controls in order to control the devices.

Since these audio/video and similar devices are not designed to communicate with each other or their communication is very limited, access to these audio/video devices is limited by their physical locations. For example, it is difficult to play an MP3 file saved in a PC hard disk drive in one room or area (a child's bedroom) on speakers located in another room or area (an entertainment room). Thus, in order for a user to enjoy music of his or her choice whenever and wherever he or she wants, each room needs to be equipped with all the necessary audio/video equipment and digital audio/video content.

Also, the audio/video devices are not designed to communicate with other home devices (e.g., TV, lighting, security system, etc.). Thus, it is difficult, if not impossible, to converge the devices for common control for certain occasions. For example, in order to watch a movie, the user must turn on a TV, a DVD player and an audio amplifier by using three different remote controls. Then the user must set the TV to receive a video signal from the DVD player, set the audio amplifier to receive an audio signal from the DVD player and use another control unit to adjust the lighting of the room. Even when a user utilizes a universal remote, as is known in the art, the result is a plurality of devices that are separately operated and are operated separately from a single universal remote. These devices do not converge and further there is no way to control their convergence as described above.

Accordingly, there is a need for a solution for the aforementioned accessibility, connectability, controllability and convergence issues.

SUMMARY OF THE INVENTION

The invention meets the foregoing needs using an automation specific IP based automation protocol, which results in a significant increase in convergence and communications between devices and other advantages apparent from the discussion herein.

In one aspect of the invention, a convergence and automation system includes an internet-protocol based (IP) network implemented with a web service for devices (WSD) protocol, a plurality of devices connected to the network, wherein each device is configured to perform at least one service, a server implemented with the WSD protocol, connected to the network and configured to control the device for converging and automating the services thereof, and at least one client implemented with the WSD protocol, connected to the network and configured to control at least a portion of the services of the devices. One of the server and the at least one client is configured to establish communication with the devices and further configured with a control panel application allowing a user to configure and test the convergence and automation system.

In another aspect of the invention, an article includes a machine readable medium having embodied thereon a program executable by a machine to allow a user to configure a convergence and automation system. The convergence and automation system includes an internet-protocol based network, hardware implemented with a web service for devices (WSD) protocol and software implemented with the WSD protocol and configured to establish communication in the hardware and perform a logging function to record said events and errors.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings:

FIG. 11(A) shows a relationship between a script and schedule;

FIGS. 12(A) and 12(B) show screen capture images of the control panel of FIG. 2 being used for starting and stopping/restarting a service, respectively;

DETAILED DESCRIPTION OF THE INVENTION

Figure 1:
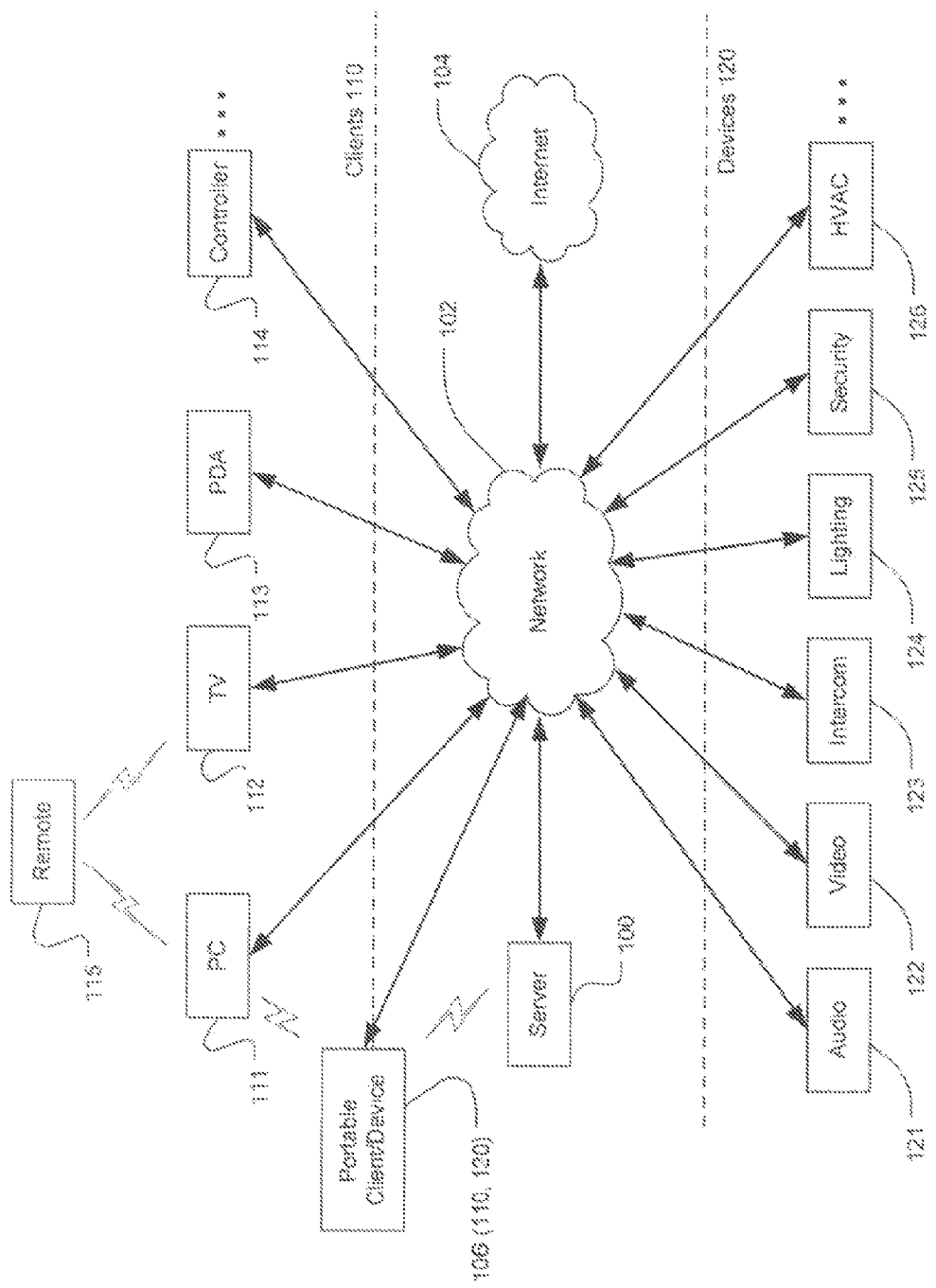
FIG. 1 shows an overview of an automation convergence system for use with a portable remote control, communications and media consumption device constructed according to the principles of the invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even it not explicitly stated herein. Description of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

FIG. 1 shows an overview of a convergence and automation system (CAS) for use with a portable remote control, communications and media consumption device constructed according to the principles of the invention. The CAS solution may be a combination of hardware and software. The hardware may include a server 100 connected to a network 102 (e.g. IP based wired and wireless network such as an Ethernet network) and may possibly be connected to the internet 104, devices 120 (e.g. audio 121, video 122, intercom 123, lighting 124, security system 125, HVAC 126, and the like) and clients 110 (e.g. TV 112, personal computer (PC) 111, personal digital assistance (PDA) 113, controller 114 such as a control panel, game controller (i.e. XBox™, not shown) and the like). Moreover, the clients 110 may include a remote control 115 or a portable device 106 for remote control, communications and media consumption, which may be configured to function as both the client and device. The server 100 may be any type of computer, such as a PC connected to the network 102. The clients 110 such as clients 111, 112, 113, 114 provide a user with control over the devices 120 such as devices 121, 122, 123, 124, 125, 126.

The software (i.e. application) enables the hardware devices 120 and/or clients 110 to communicate with each other despite their different proprietary languages and communication protocols, and may provide the user with control over most or all the devices 120 from a single client. The application may utilize at least one portion of the hardware to send commands to the device 120 and receive feedback from them. The application integrates centralized device control into a PC based media environment (e.g., Microsoft Windows XP Media Center™ or Microsoft Windows Vista™ environment) that may store, organize and play digital media content. The user may use the remote control 115 or the portable device 106 to listen to music, watch and record television, enjoy family photographs and home movies, as well as adjust the lighting, secure the home, adjust the temperature, distribute music throughout the house, check surveillance cameras and the like. Moreover, the portable device 106 has further communication features as noted below.

The application may be implemented with Web Services. The Web Services use standard Internet protocol (IP) and are based on standard XML-related technologies such as SOAP (Simple Object Access Protocol) for communications and WSDL (Web Services Device Language) to describe interfaces. The devices implemented with Web Service for Devices (WSD) become black boxes on the network, providing services to any application, on any platform, written in any language. Moreover, the use of WSD allows for the capabilities of Universal Plug and Play (UPnP) that seamlessly connects and simply implementation as is known in the art.

The application maximizes flexibility and scalability with an elegant n-tiered, service oriented architecture that allows loosely occupied components to easily interact with each other across the network. In particular the application may be created using Microsoft™ .NET framework and coded primarily in C#. The application accordingly embraces the tremendous benefits of web services for the control of the devices.

The device/software modules, methods or implementation described herein are intended for operation with dedicated hardware implementations including, but not limited to, semiconductors, application specific integrated circuits, programmable logic arrays, and other hardware devices constructed to implement the software modules, methods or implementation functionality described below. Moreover, various embodiments of the invention described herein are intended for operation as software programs running on a computer processor such as PC running the Windows™ operating system as is well known in the art. The functional and operational description of the various device/software modules, methods or implementations described herein may be used together, separately, or in various combinations thereof. The application as implemented in the device/software modules will now be described in detail.

The invention is directed to a user interface for configuring CAS to maximize its convergence and automation capabilities.

Terms and Definitions

The definitions for the terms used in this invention are explained in Table 1.

TABLE 1

| Term | Definition |
| --- | --- |
| Action | A basic building block of a command that is sent to a device to cause a change. Actions are combined with action properties to comprise commands. |
| Command | A basic building block of a script that sends an action and any associated action properties to a device to accomplish a specified change. Scripts are comprised of a string of commands. |
| Communications | A link between a component and CAS or a device and a component that enables information to be passed between the two items. |
| Component | Basic building block of a CAS configuration that includes a controller (intelligence) and the devices regulated by the controller. For example, a component is an HVAC system controller combined with the thermostats regulated by the controller. Some components contain the intelligence in the device, resulting in a self-contained component |
| Component Details | Properties set up in CAS to enable the component to communicate with other components on the network where CAS resides. |
| Configuration | Collection of components, devices, menus, scripts, and schedules and corresponding properties for a particular CAS installation. |

TABLE 1-continued

| Term | Definition |
| --- | --- |
| Configuration Tool | A software application that enables the creation and editing or configuration, the addition and editing of components, devices, menus, schedules, and scripts to the configurations. |
| Controller | A hardware element that regulates a device within an overall component. Also known as an intelligent system. |
| Control Panel | A software application that advanced CAS installers can use to configure and test a CAS installation. |
| Device | Individual hardware element in a home network such as a light or a thermostat. |
| Device Control Group | A group of devices configured to be controlled as a single device. |
| Discovery | The ability of CAS to detect components and their devices on a home network and to retrieve information from the devices. |
| Integrator | Person who uses the CAS configuration tool to add, edit, and delete components in the configuration and creates the scripts and schedules from the worksheets and information provided by the various system installers. |
| Intelligent System | A hardware element that regulates a device within the overall component. Also known as a controller. |
| OEM | Original Equipment Manufacturer (OEM). The original manufacturer of a piece of hardware or software. |
| Schedule | Time period when the script is to run. A schedule consists of a schedule type (start time and date, or day) and an action (script to run). |
| Script | String of commands that sends actions to a variety of devices. For example, you can have a script that sends a command to turn on the lights in the foyer, lower the audio volume, and then ramp up the temperature on the thermostat. Scripts can be triggered either manually (button activated) or automatically (scheduled). Scripts run the commands in the order they appear in the script. |
| Server | A computer that serves up information to other applications and client computers. This is also known as the back-end computer, while clients are known as front-end computers. |
| Service | 1. Program or routine that provides support to other programs, particularly at a low (close to the hardware) level. 2. In networking, specialized, software-based functionality provided by network servers - for example, directory services that provide the network equivalent of "phone books" needed for locating users and resources. |
| Service Provider | A computer hardware element on which CAS resides and provides control of the various devices integrated with CAS. |
| Source | The device that is the point of origin for audio for the component. |
| Template | A means of configuring a generic (non-certified) device. |
| Trigger | Action that causes a schedule or a script to run. For example, a date and time is a trigger for a scheduled script to run. |
| Zone | An area of coverage for an audio or a security system component. For example, you can have one security camera component that covers the back door and patio area (zone 1) and a second security camera that covers the front door area (zone 2). |

Basic Operation

Figure 2:
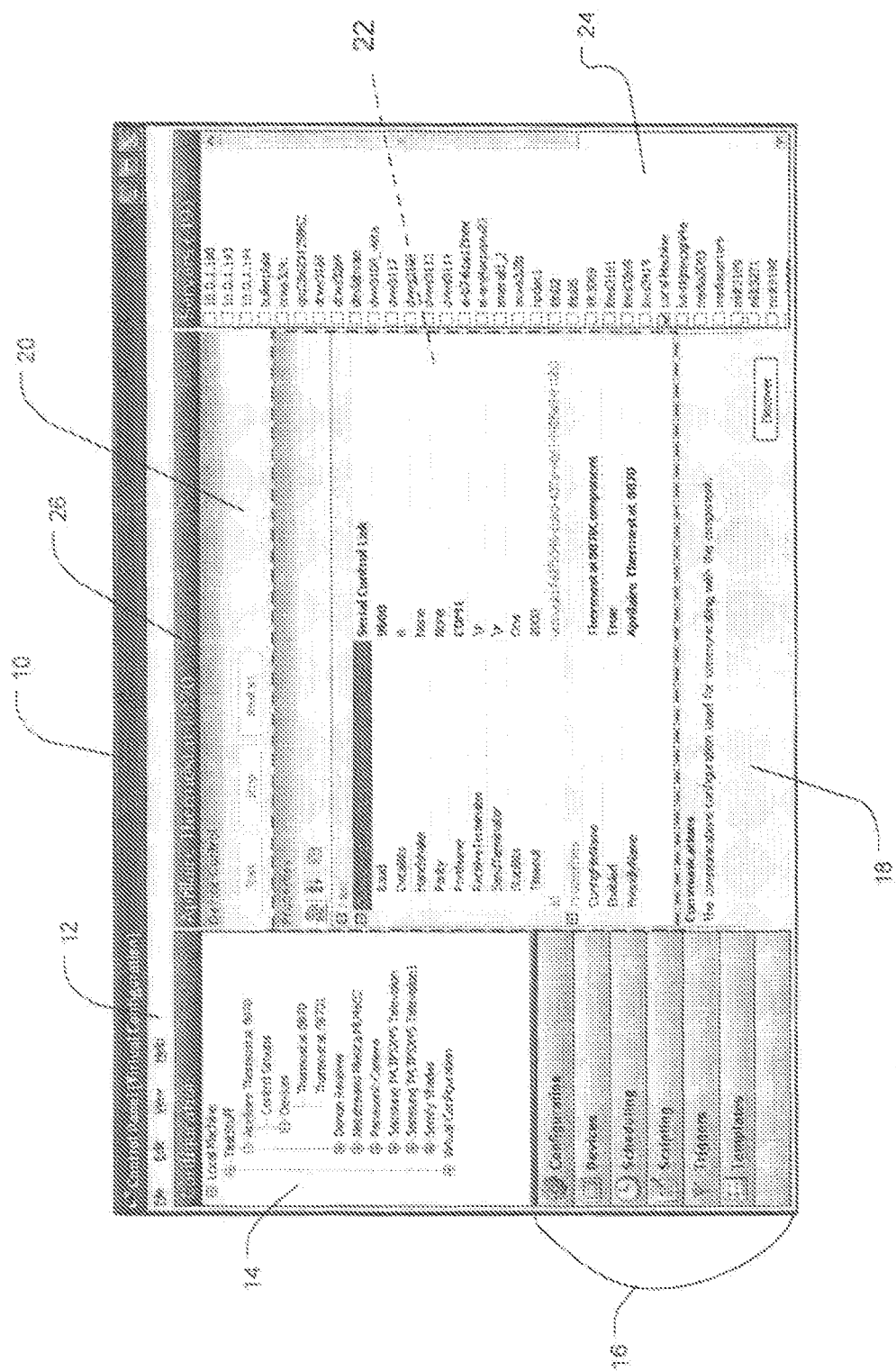
FIG. 2 shows a screen capture image of a control panel for configuring a convergence and automation system (CAS), constructed according to the principles of the invention.

FIG. 2 shows an exemplary user interface configuration window 10, which will be referred to as control panel, constructed according to the principles of the invention. The control panel of the invention may be integrated with the control panel of a Window™ operating system. As commonly known, the control panel application may be started by opening Windows Explorer™, navigating to the application folder in the automation convergence folder on the local drive, and double-clicking the corresponding executable file or program (e.g., controlpanel.exe). The user may navigate the control panel 10 using a mouse, keyboard, input device, or the like. As shown in FIG. 2, the control panel 10 of the invention may include several elements such as a menu bar 12, navigation pane 14, functional area pane 16, definition pane 18, device control buttons 20, control pane 22, server pane 24 and/or component/device name bar 26 and the like that provides control of all of the devices and clients.

The menu bar 12 may provide menus for the control panel 10, such as "File" (i.e., save, save all, and/or exit functions and/or the like), "Edit" (i.e. new configuration new component, new device, new schedule, new script and/or delete functions and/or the like), "View" (i.e., server function and/or the like), "help" (i.e., about function and/or the like). The navigation pane 14 may contain configurations, devices, schedules and/or scripts and/or the like in a tree view. As well known, if a navigation item has a plus (+) sign next to it, the user may click the item to view additional sub items. If a navigation item has a minus (−) sign next to it, the user may click the item to hide the additional sub items.

The functional area pane 16 may contain several buttons for "Configuration," "Devices," "Scheduling," "Scripting," "Triggers," "Templates," and/or the like. The "Configuration" button allows the user to add and edit configurations on servers. The "Devices" button allows the user to view original manufacturer information, test devices, and control devices. The "Scheduling" button allows the user to set up schedules to run scripts. The "Scripting" button allows the user to create and edit scripts for running components and devices. The "Triggers" button allows the user to identify a specific device status and condition as a trigger to automatically execute a script when it occurs. The "Templates" button allows the user to add control for certain non-certified devices (CD players, DVD players, audio receivers, displays, and so on).

The definition pane 18 may display the definitions and descriptions of components, communication, and device settings associated when the user clicks in the setting field in the control pane 22. The device control buttons 20 may be provided to enable the user to control and test the devices and may include "start," "stop" and/or "restart" buttons and/or the like. The control pane 20 may display the information about the component, device, schedule, script, or configuration. The control pane 20 may be where the user completes the majority of the work including adding or editing settings. The server pane 24 may display all of the servers (service providers) on the automation network. The server with a check mark next to them are selected and displayed in the Navigation pane 14. To select a server and display it in the Navigation pane, the user may click the server in the Server pane 24. The component/device name bar 26 displays the name of the component or device selected by the user selected from the Navigation pane 14. To exit the control panel 10, the user may click the close X in the upper-right corner of the control panel 10. If the user has made changes to a configuration, he or she may be prompted to save the configuration before closing. Next, each of the features of the functional pane 16 will be discussed.

Configurations

A configuration is a collection of components, devices, menus, scripts, and schedules and corresponding properties for a particular installation. Before using the convergence system, the user may need to create a configuration for the network that he or she is working with. This configuration may run on the convergence system and may become part of the interface that the user interacts with daily. Before working with a configuration, the user may need to review the product sheets and other information provided by the convergence system installers to determine friendly names, communications settings, and device settings, so the information in the configuration matches the information provided by the installers.

To create a configuration, the user may start the control panel 10 as previously mentioned, click the "Configurations" button in the functional area pane 16, click the name of the server displayed in the Servers pane 24 that he or she wants to add the configuration to. Subsequently, the selected server may appear in the navigation pane 14 where the user may select the server that he or she wants to add the configuration to and, and click "New" and "Configuration." The, the user may, in the control pane 22, under "Configuration Name," highlight the name in the field and type the new name for the configuration, which results in changing of the name in the navigation pane 14.

Figure 3A:
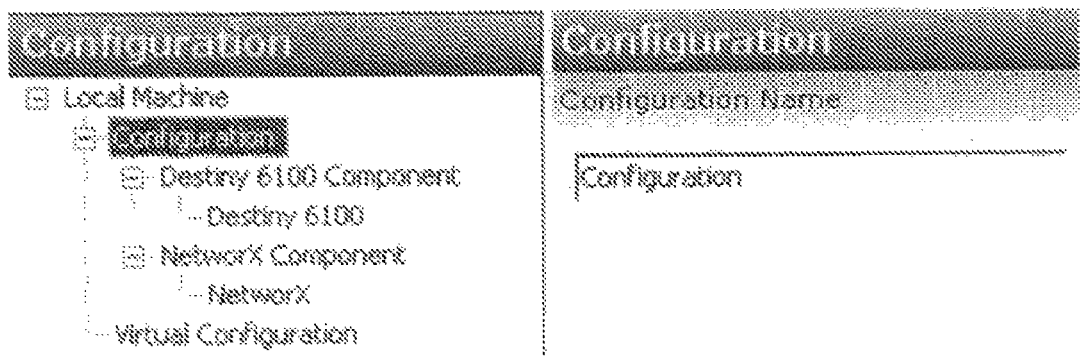
FIGS. 3(A) and 3(B) show screen capture images of the control panel of FIG. 2 being used for locating the activating a configuration, respectively.

To locate the configuration, after starting the control panel 10, the user may select "Configuration" in the functional area pane 16. In the Servers pane 24, the user may select the name of the server that contains the configuration. If the user is unsure of which server contains the configuration, the user may click each server to place a check mark next to the server name to display the server in the Navigation pane 14 so that the user can view all configurations on the network. Upon selecting the server name, the selected server may be displayed in the Navigation pane 14, as shown in FIG. 3(A). In the Navigation pane 14, the user may select the server that contains the configuration and further select the name of the configuration the user wants to view. Upon selecting the configuration name, the Configuration Name field may be displayed in the Control pane 22. If the configuration contains components, devices, scripts, and schedules, a plus (+) sign may be displayed next to the configuration name. Otherwise, no plus (+) nor minus (−) sign may be displayed next to the configuration name. If a plus (+) sign is displayed, the user may select the item to view additional sub items. If a navigation item has a minus (−) sign next to it, the user may click the item to hide the additional sub items.

Editing a configuration may involve adding, editing, or deleting components, devices, scripts or schedules. Editing a configuration in the control panel enables the user to change the name of the configuration. To edit a configuration in the control panel 10, the user may start the control panel 10 and select "Configuration" in the functional area pane 16. Then, the user may select the name of the server that contains the configuration to be edited in the Servers pane 24, which may cause the selected server to be displayed in the Navigation pane 14. In the Navigation pane 14, the user may select the server that contains the configuration to be edited and select the configuration to view the configuration contents in the Navigation pane 14. Then, the user may, in the Control pane 22, under "Configuration Name," highlight the name of the configuration and type the new configuration name, it required. Otherwise, the user may need to follow other appropriate procedures to make the changes.

After making changes to a configuration, the user may need to save the configuration for the changes to the applied. If the user makes a change and does not save the configuration before closing the control pane, the user may be prompted to save changes. To save a configuration, after making changes to the configuration, the user may select "File" and "Save" in the menu bar 12. The control panel 10 may display messages regarding verifying the number of devices and verifying the number of scripts if these numbers do not exceed the maximum counts. The configuration is then saved. If the configuration is not the active configuration, the user may not be able to view the changes. To view the changes, the user may need to set the configuration as the active configuration.

Figure 3B:
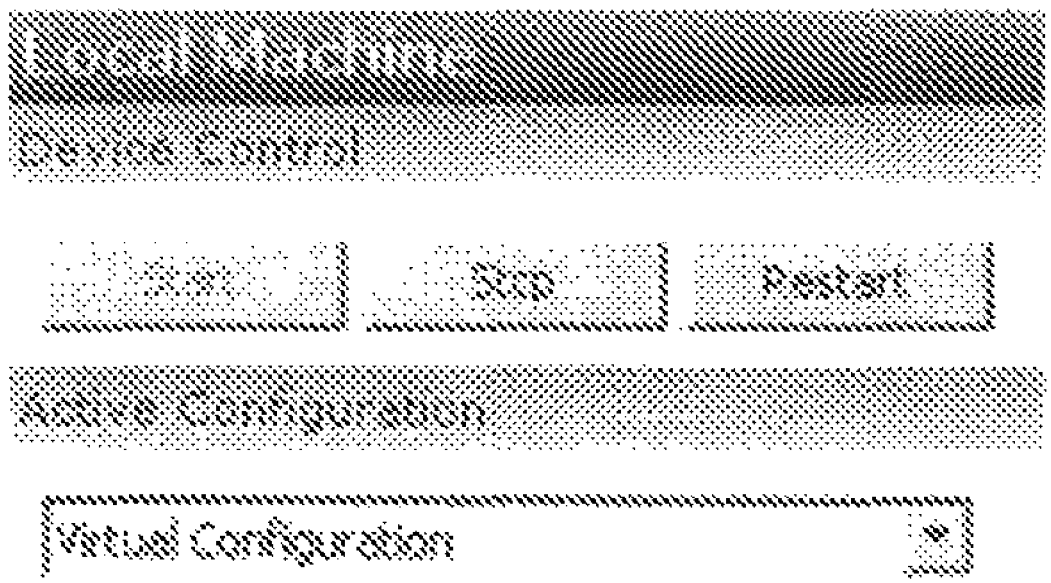

Activating a configuration may set one configuration as the running configuration on the server (i.e., service provider). Each service provider may have multiple configurations, but may have only one active configuration. To activate a configuration, the user may click "Configuration" in the functional area pane 16. Then, the user may select the name of the server in the Servers pane 24 that contains the configuration to be activated, which may result in the server being displayed in the Navigation pane 14. In the Navigation pane 14, the user may select the server name containing the configuration to be activated. Then, the user may, in the Control pane 22, under Active Configuration, select the configuration to activate from the drop-down list, as shown in FIG. 3(B). The configuration is then activated, and the next time the user starts the configuration tool, this configuration may be displayed as the active configuration.

Configurations may become obsolete over time as components change and the home network grows. When this occurs, the user may delete a configuration that is no longer useful. If the user deletes a configuration and has no archived copies of the configuration, he or she may lose all information in the configuration. If the user deletes an active configuration on a server (i.e., service provider), the user may have to activate a different configuration.

Before deleting a configuration, the user may need to verify that the configuration to be deleted is not the active configuration on the server. If the configuration to be deleted is the active configuration on the server, the user may need to make a different configuration active on the server. Then, the user may need to verify that he or she wants to permanently delete the configuration. The process of deleting a configuration from a server may start by selecting "Configuration" in the functional area pane 16. Then, in the Servers pane 24, the user may select the name of the server that contains the configuration to be deleted. In the Navigation pane 14, the user may select the plus (+) sign next to the server name containing the configuration to be deleted to display all configuration on that server. Then, in the Navigation pane 14, the user may select the configuration to be deleted and select "Delete." The control panel 10 may display a verify deletion message. By verifying deletion, the configuration may be deleted from the server.

Components

Components are the basic building block of a CAS configuration that may include a centralized intelligent system and the devices regulated by the intelligent system. A component may be any one of the devices 120 or client 110 shown in FIG. 1. For example, a component may be an HVAC system controller (i.e., intelligent system) combined with the thermostats (i.e., devices) regulated by the intelligent system.

Figure 4A:
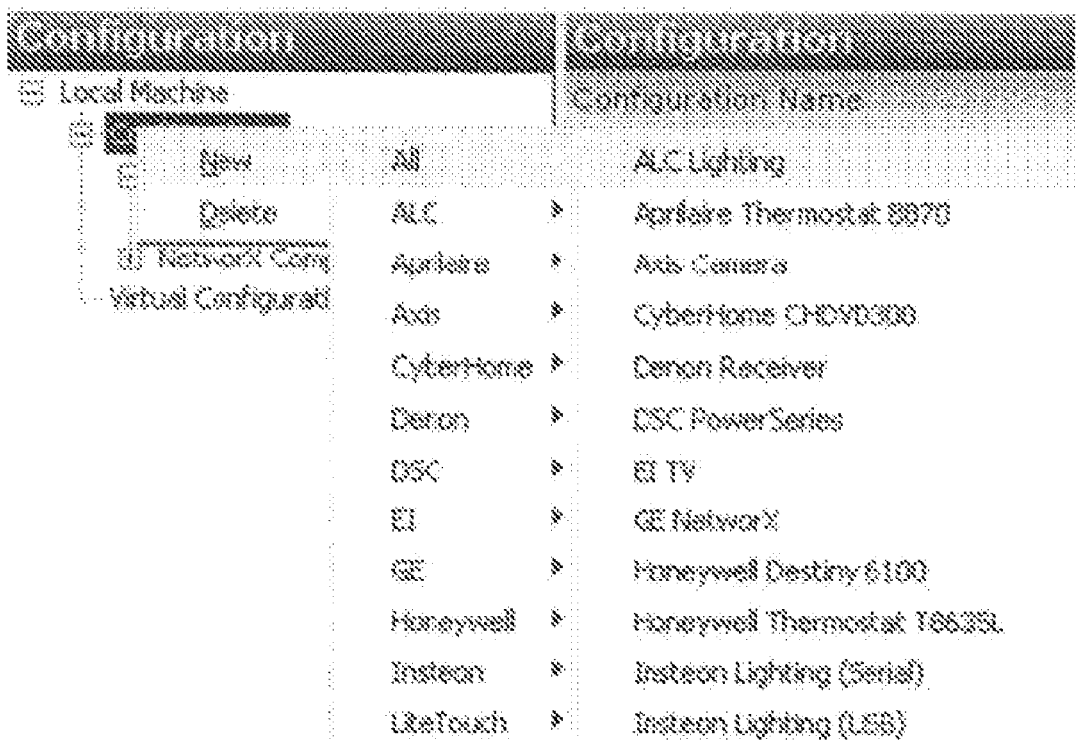
FIGS. 4(A) and 4(B) show screen capture images of the control panel of FIG. 2 being used for adding and editing a component, respectively.

Before adding devices, creating scripts or schedules, or using CAS, the user may need to add components to a configuration. After creating a new configuration, the user may continue adding components as systems are added to the network. To add a component to a configuration, the user may select "Configuration" in the functional area pane 16. In the Servers pane 24, the user may click the name of the server that contains the configuration that he or she wants to which to add a component. Then, the server may be displayed in the Navigation pane 14. In the Navigation pane 14, the user may select the plus (+) sign next to the server name containing the configuration he or she wants to add a component, which may result in all configurations on the server being displayed in the Navigation pane 14. In the Navigation pane 14, the user may select the configuration that he or she wants to add a component to. Then, the user may select "New" select the component category, and then select the component to be added to the configuration, as shown in FIG. 4(A). The component is then added to the configuration and the component settings may be displayed in the control pane 22.

As the network and components change, the user may need to edit a component in an existing configuration to meet the user's needs. The user may not need to create a new configuration to make a change to the component because he or she may simply edit the existing component.

Figure 4B:
Figure 5:
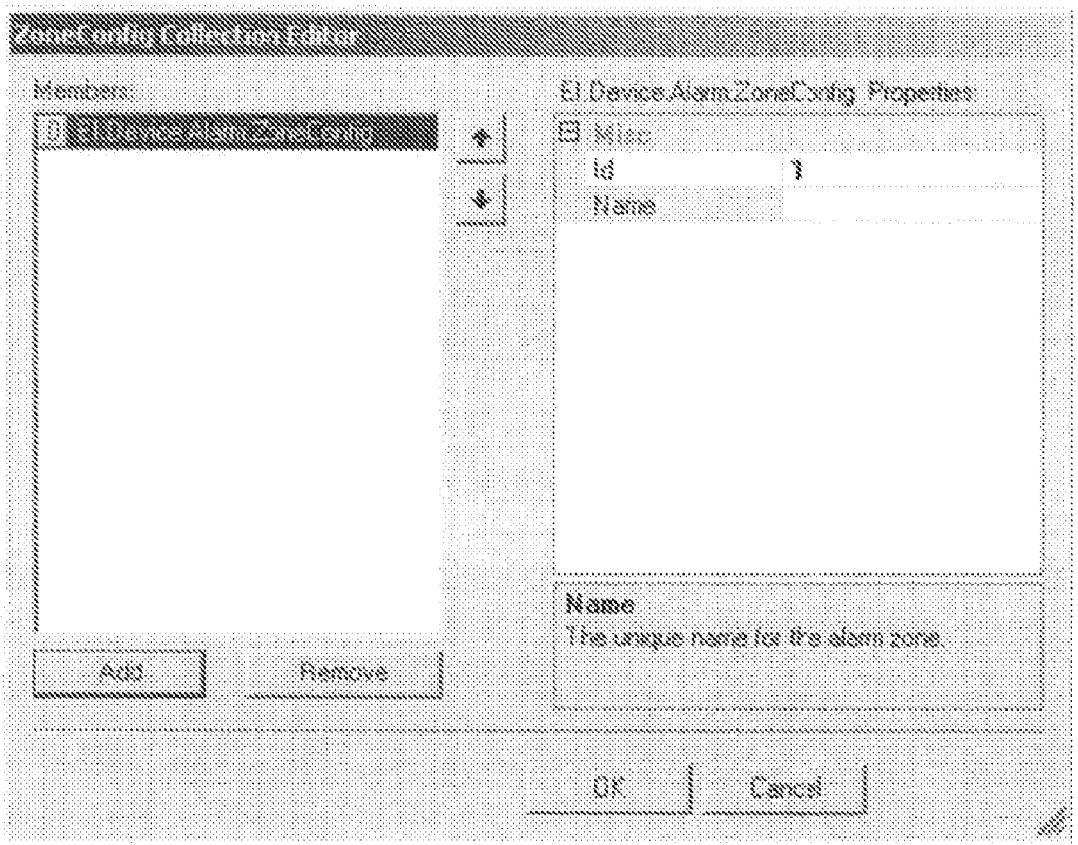
FIG. 5 shows a screen capture image of the control panel of FIG. 2 being used for adding or editing a zone.

To edit a component in a configuration, the user may select "Configuration" in the functional area pane 16. In the Servers pane 24, the user may select the name of the server that contains the configuration with the component to be edited, which may result in the server being displayed in the Navigation pane 14. In the Navigation pane 14, the use may click the plus (+) sign next to the server name containing the configuration and component to be edited, which may result in all available configurations on the server being displayed in the Navigation pane 14. In the Navigation pane 14, the user may click the plus (+) sign next to the configuration containing the component to be edited and then select the component category containing the component to be edited. In the Control pane 22, the user may make any changes t the component settings by double-clicking in a setting name and type a new value or making a new selection from a list, as shown in FIG. 4(B). After making all changes, the user may save the configuration by selecting "File" and "Save" in the menu bar 12.

If there is a component that is not required, or if the user changes the type of component after the initial configuration, the user may open the configuration and delete the component from the configuration. To delete a component from an existing configuration, the use may select "Configuration" in the functional area pane 16. In the Servers pane 24, the user may select the name of the server that contains the configuration with the component to be deleted, which may result in the server being displayed in the Navigation pane 14. In the Navigation pane 14, the user may click the plus (+) sign next to the server name containing the configuration and component to be deleted. Then the user may click the plus (+) sign next to the configuration containing the component to be deleted. In the Navigation pane 14, the user may right-click the component category containing the component to be deleted and select "Delete." The control panel 10 may display a deletion verification message. By clicking "YES," the selected component may be deleted.

Zones

A zone is an area of coverage for an audio component, a security system component and/or the like. For example, one security camera component may cover a back door and patio area (zone 1) and a second security camera component may cover a front door area (zone 2). There may be more than one zone in an area (e.g., room) depending on the make up of the area. Also, more than one zone may be associated with a component. To add a zone to a component in a configuration, the user may select "Configuration" in the functional area pane 16. The in Servers pane 24, the user may select the name of the server that contains the configuration with the component he or she wants to add a zone to. Then, the server may be displayed in the Navigation pane 14. In the Navigation pane 14, the use may click the plus (+) sign next to the server name containing the configuration and component he or she wants to add a zone. In the Navigation pane 14, the user may click the plus (+) sign next to the configuration containing the component that he or she wants to add a zone. In the Navigation pane 14, the user may select the component category containing the component that he or she wants to a zone. Then, in the Control pane 22, the user may select "Zones" and then select a button next to "Collection," which may open a zone configuration collection editor, as shown in FIG. 4(B). In the zone configuration collection editor, the user may select "Add" which causes the zone to be added to the Members list. Then, under "Members," the user may select the zone that has been just added. In the Properties pane, the user may double-click "ID" and type the new ID for the zone, and then double-click Name and type the new name of the zone. After adding all new zones, the user may need to save the configuration.

After adding zones to a component, the user may edit the zone. To edit a zone in a configuration, after starting the control panel 10, the user may select "Configuration" in the functional area pane 16. In the Servers pane 24, the user may click the name of the server that contains the configuration with the component of the zone to be edited, which may result in the server being displayed in the Navigation pane 14. In the Navigation pane 14, the user may click the plus (+) sign next to the server name containing the configuration and component of the zone to be edited. In the Navigation pane 14, the user may click the plus (+) sign next to the configuration containing the component of the zone to be edited. In the Navigation pane 14, the user may click the component category containing the component of the zone to be edited. In the Control pane 22, the user may select "Zones" and then select the button next to "Collection," which may open a zone configuration collection editor, as shown in FIG. 4(B). In the zone configuration collection editor, under "Members," the user may select the zone to be edited. In the Properties pane, the user may select "ID" and type the new ID for the zone, and then select "Name" and type the new name of the zone. After making changes, the user may need to save the configuration.

As the network changes and audio and security components are added and deleted from the network, the user may delete zones to fit the user's needs. To delete a zone from a configuration, after starting the control pane 10, the user may select "Configuration" in the functional area pane 16. In the Servers pane 24, the user may click the name of the server that contains the configuration with the component of the zone to be deleted, and the server may be displayed in the Navigation pane 14. In the Navigation pane 14, the user may click the plus (+) sign next to the server name containing the configuration and component of the zone to be deleted. In the Navigation pane 14, the user may click the plus (+) sign next to the configuration containing the component zone to be deleted. In the Navigation pane 14, the user may select the component category containing the component of the zone to be deleted. In the Control pane 22, the user may select "Zones" and then click the button next to "Collections," and the zone configuration collection editor may open. In the zone configuration collection editor, under "Members," the user may select the zone to be deleted. By clicking "Remove," the selected zone is removed. After making the changes, the user may need to save the configuration.

Sources

Sources are hardware elements, such as receivers, CD players and the like, that provide audio content to the audio devices in the CAS. When the user adds an audio component, he or she may need to associate a source with the component so that the component may be able to access the audio content. The user may change the source associated with the audio component if necessary.

To add a source to a component in a configuration, after starting the control pane 10, the user may select "Configuration" in the functional area pane 16. In the Servers pane 24, the user may select the name of the server that contains the configuration with the component that he or she wants to add a source to, and then the server may be displayed in the Navigation pane 14. In the Navigation pane 14, the user may click the plus (+) sign next to the server name containing the configuration and component that he or she wants to add a source to. In the Navigation pane 14, the user may click the plus (+) sign next to the configuration containing the component that he or she wants to add a source to. In the Navigation pane 14, the user may select the component category containing the component that he or she wants to add a source to. In the Control pane 22, the user may select "Sources" and then click the button next to "Collection," which may open the source configuration collection editor. In the source configuration collection editor, the user may select "Add" which result in the source being added to the Members list. Under "Members," the user may select the source that has been just added. In the Properties pane, the user may double-click each of the settings shown in Table 2 and provide a value for the setting. After adding all sources, the user may need to save the configuration.

TABLE 2

Figure 6:
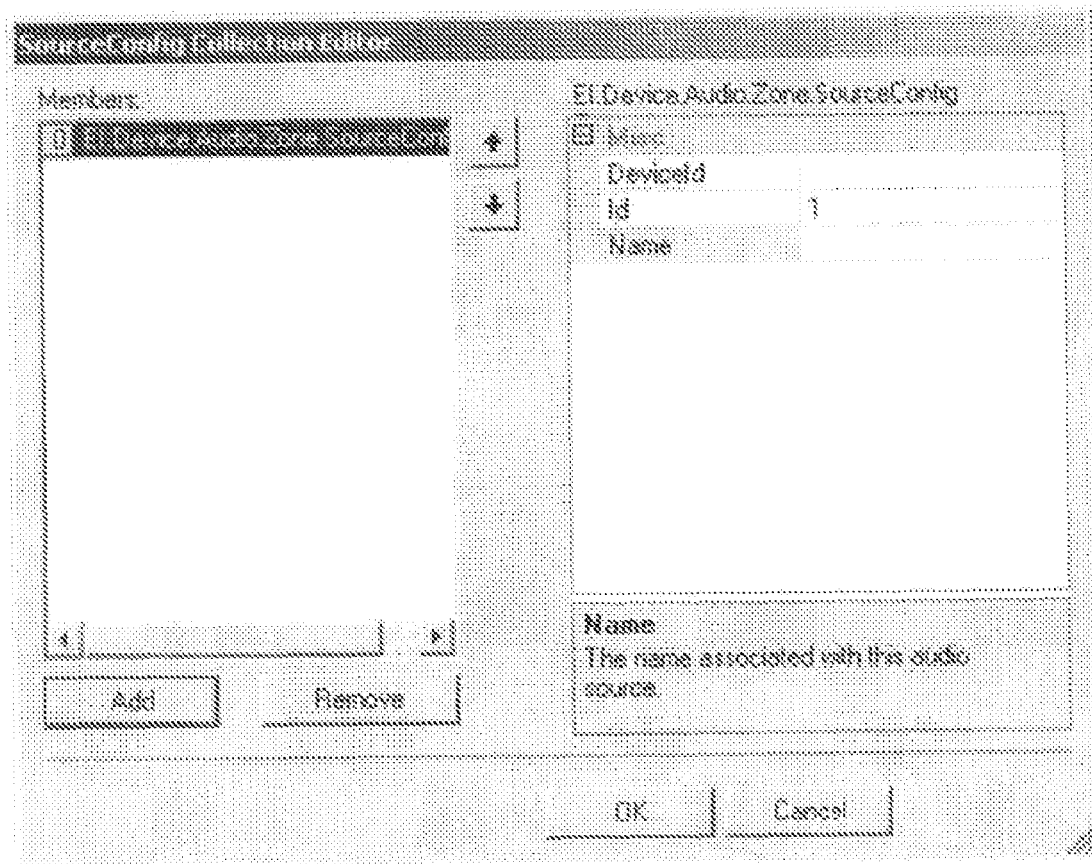
FIG. 6 shows a screen capture image of control panel of FIG. 2 being used for adding or editing a source.

| Setting | Description |
| --- | --- |
| DeviceId | Name of the device associated with the audio source. |
| Id | Unique identifier for this source. Default is 1. |
| Name | Friendly name for this device. | to edit a source for a component in a configuration, after starting the control panel 10, the user may select "Configuration" in the functional area pane 16. In the Servers pane 24, the user may select the name of the server that contains the configuration with the component that he or she wants to edit a source, and then the server may be displayed in the Navigation pane 14. In the Navigation pane 14, the user may click the plus (+) sign next to the server name containing the configuration and component that he or she wants to edit a source. In the Navigation pane 14, the user may click the plus (+) sign next to the configuration containing the component that he or she wants to edit a source. In the Navigation pane 14, the user may select the component category containing the component that he or she wants to edit a source for. In the Control pane 22, the user may select "Sources" and then click the button next to "Collection" which may open the source configuration collection editor, as shown in FIG. 6. In the source configuration collection editor, under "Members," the user may select the name the source to edit. In the Properties pane, the user may double-click each of the settings shown in Table 2 and provide a value for the setting. After editing all sources, the user may need to save the configuration.

To delete a source from a component in a configuration, after starting the control panel 10 and select "Configuration" in the functional area pane 16, the user may select, in the Servers pane 24, the name of the server that contains the configuration with the component that he or she wants to delete a source from, which may result in the selected server being displayed in the Navigation pane 14. In the Navigation pane 14, the user may click the plus (+) sign next to the server name containing the configuration and component that he or she wants to delete a source from and then click the plus (+) sign next to "Configuration." In the Navigation pane 14, the user may click the component category containing the component that he or she wants to delete a source from. In the Control pane 22, the user may select "Sources" and then click the button next to "Collection" which opens the source configuration collection editor. In the editor, the user may select "Remove" which may result in the source being removed from the Members list. After deleting the sources, the user may need to save the configuration.

Devices

Devices may be individual hardware elements in a home network such as a light, thermostat and the like. Figuratively speaking, the devices are one half of a component in the CAS, with the other half being a centralized intelligence system, which regulates the operation of the device. To set up a device, the user may need to have components in the configuration. In the control panel 10, the user may add a component and device during the same process, but in the configuration tool these tasks may need to be separate processes. After the user has added components, he or she may be able to add devices at any time to an existing component. In the CAS, the user may only be able to associate a device that is compatible with the specific component. For example, the user may not be able to add a lighting device to an HVAC component as these two are may not be compatible. After adding a device to a configuration, the user may be able to include the device in a script to run automatically (i.e., on a schedule) or manually (i.e., by button). The user may also be able to associate a device with a sub menu to display the device in the room menu for a specified room. The user may have to use the configuration tool to work with menus.

Adding a device may be associating the device with a component controller (i.e., the intelligent system). For example, when the user adds a lighting device, he or she may associate the specific light with the intelligent lighting system, which may receive the commands from the CAS server and regulates the light. As time passes, the user may be able to add new devices due to remodeling, additions, or other changes. The user may not need to create a new configuration to add a new device.

Figure 7A:
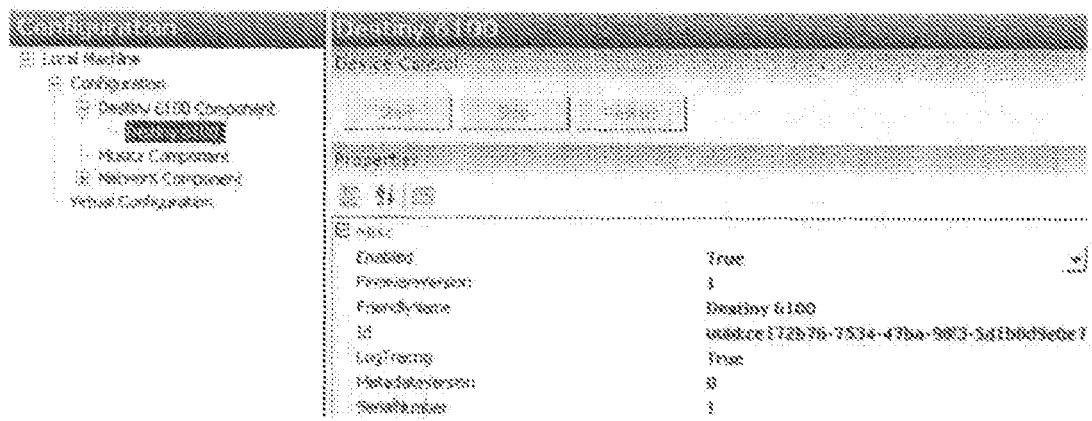
FIGS. 7(A), 7(B), 7(C) and 7(D) show screen capture image of the control panel of FIG. 2 being used for adding, discovering and controlling a device, and viewing device manufacture information, respectively.

To add a device to a configuration, after starting the control panel 10 and selecting "Configuration" in the functional area pane 16, the user may select, in the Servers pane, the name of the server that contains the configuration he or she wants to add a device to and the server may be displayed in the Navigation pane 14. In the Navigation pane 14, the user may click the plus (+) sign next to the server name containing the configuration he or she wants to add a device to, and then click the plus (+) sign next to the configuration. In the Navigation pane 14, the user may select the component that he or she wants to add a device to and select "New," and select the device he or she wants to add to the component. As shown in FIG. 7(A), the device may be added to the configuration directly beneath the component in the Navigation pane and the device settings may be displayed in the Control pane 22. In the Control pane 22, the user may select a setting to activate the setting and make a change to the setting value. After completing all of the changes to the settings, the user may need to save the configuration.

If the device is produced in a manner that enables it to be discovered on a network, the user may be able to discover the device along with all of the properties associated with the device. Discovery is the ability of CAS to automatically detect components on the same network and retrieve information about the devices. If the user adds a light to a network that supports automatic discovery, he or she may not have to add properties manually to the configuration to support the light because all of the information related to the light may be automatically recognized and placed into the proper files for use in the CAS. Not all components or devices may be produced to be discovered. If a component or device cannot be discovered, a Discovery button may not appear.

Figure 7B:
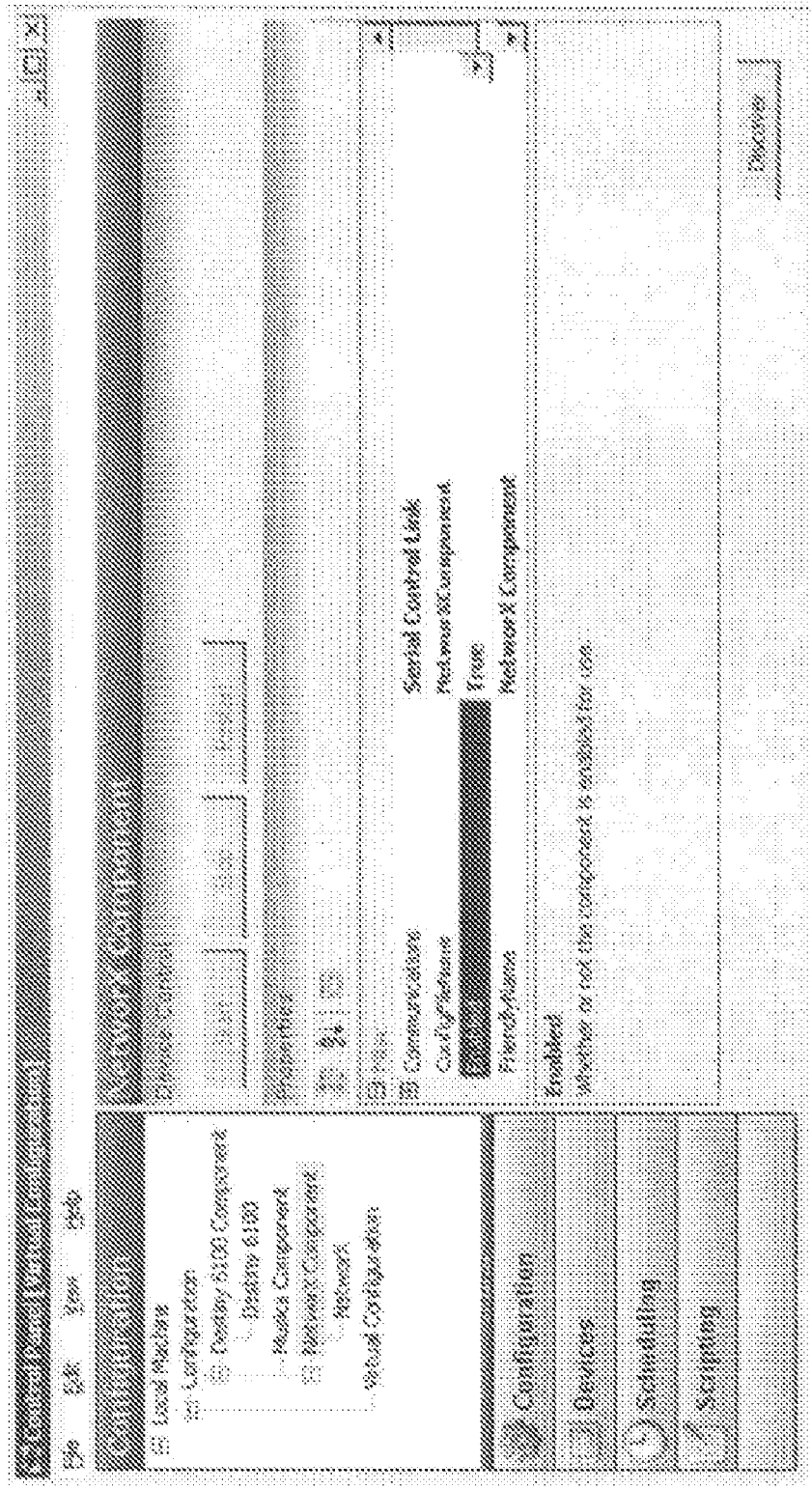

To discover a device, after starting the control panel 10 and selecting "Configuration" in the functional area pane 16, the user may select, in the Servers pane 24, the name of the server that contains the configuration and component that he or she wants to discover devices for and the server may be displayed in the Navigation pane 14. In the Navigation pane 14, the user may click the plus (+) sign next to the server name containing the configuration that contains the component that he or she wants to discover devices, and then click the plus (+) sign next to the configuration. In the Navigation pane 14, the use may click the component that he or she wants to discover devices. In the Control pane 22, the user may select the Discover button in the lower right of the window, as shown in FIG. 7(B). Then, the devices may be discovered and added to the Navigation pane 14 under the component, and the user may be able to edit the device settings, if required. After discovering the devices, the user may need to save the configuration.

To edit a device, after starting the control panel 10 and selecting "Configuration" in the functional area pane 16, the user may select, in the Servers pane 24, the name of the server that contains the configuration containing the device to be edited, and the server may be displayed in the Navigation pane 14. In the Navigation pane 14, the user may click the plus (+) sign next to the server name containing the configuration that contains the device to be edited, and then click the plus (+) sign next to the configuration. In the Navigation pane 14, the user may click the plus (+) sign next the component containing the device to be edited. Under the component, the user may select the device to be edited, as shown in FIG. 7(B), and the device settings may be displayed in the Control pane 22. In the Control pane 22, the user may select a setting to activate the setting and make a change to the setting value. After completing all of the changes to the settings, the user may need to save the configuration.

To delete a device, after starting the control panel 10 and selecting "Configuration" in the functional area pane 16, the user may select, in the Servers pane 24, the name of the server that contains the configuration containing the device to be deleted and then the server may be displayed in the Navigation pane 14. In the Navigation pane 14, click the plus (+) sign next to the server name containing the configuration that contains the device to be deleted, and then click the plus (+) sign next to the configuration. In the Navigation pane 14, the user may select the plus (+) sign next the component containing the device to be deleted. Under the component, the user may select the device to be deleted. By selecting "Delete," the device may be deleted. A deletion verification message may occur to make sure the user wants to delete the device. After completing all of the changes to the settings, the user may need to save the configuration.

Figure 7C:
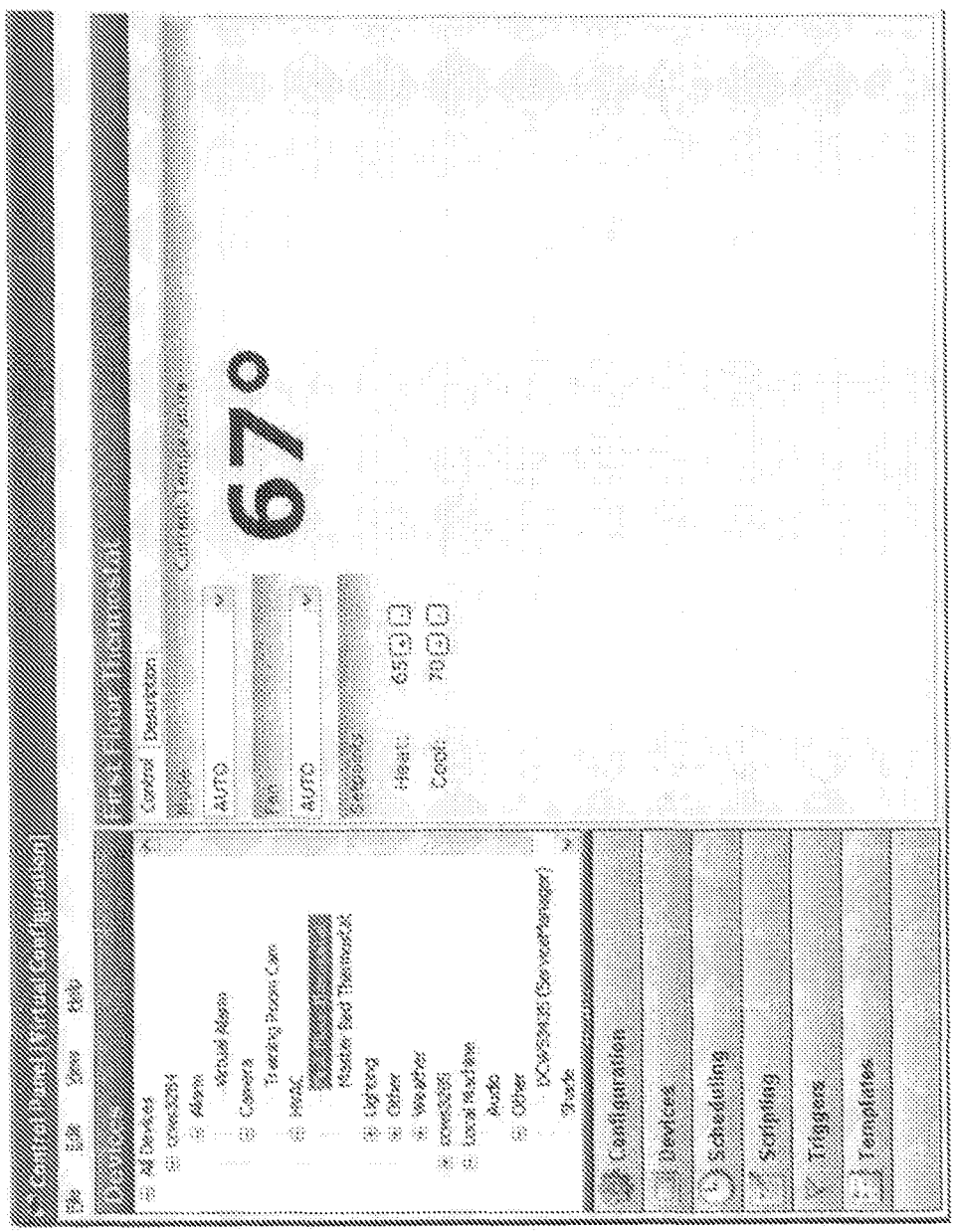

Controlling a device may be useful when the user has added a new device and wants to test it to ensure that device is working properly. To control a device, the user may select "Devices" in the functional area pane 16. Then, the user may select, in the Servers pane 24, the name of the server that contains the configuration containing the deice he or she wants to control, and the server may be displayed in the Navigation pane 14. In the Navigation pane 14, the user may click the plus (+) sign next to the server name containing the configuration that contains the device he or she wants to control, and then click the plus (+) sign next to the configuration. In the Navigation pane 14, the user may click the plus (+) sign next the component containing the device that he or she wants to control. Then, the user may select, under the component, the device he or she wants to control, and the device controls may be displayed in the Control pane 22. In the Control pane 22, the user may click a Control tab to ensure that the device controls display. Depending on the device to be controlled, the user may type new values or make selections from lists to control the device. For example, if the user is controlling or testing a thermostat, he can change the heat temperature set point to a new value, change the mode of operation from OFF to AUTO, and turn the fan ON, as shown in FIG. 7(C). The changes made by the user may control the device appropriately. If there is an issue, the user may need to ensure that the configuration is the active configuration and that the communication connection between the device and the computer is not experiencing errors.

Figure 7D:
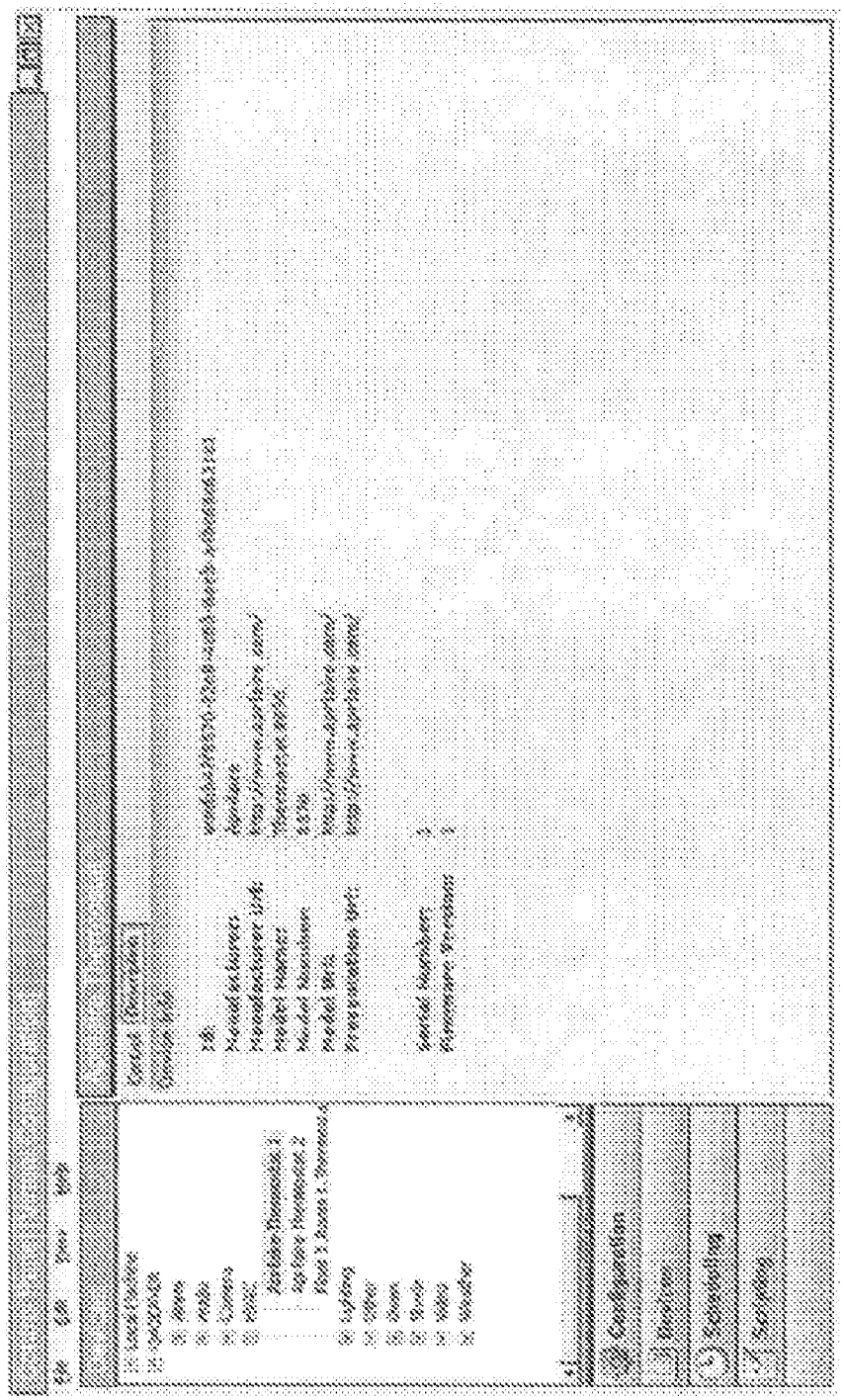

Viewing the Original Equipment Manufacturer (OEM) device information may be useful when the user needs to contact the manufacturer with a question or to find the serial number or firmware version used with the device. To view the device OEM information, the user may select, in the Servers pane 24, the name of the server that contains the configuration containing the device for which he or she wants to view the OEM information, and then the server may be displayed in the Navigation pane. In the Navigation pane 14, the user may click the plus (+) sign next to the server name containing the configuration that contains the device for which the user wants to view the OEM information, and then click the plus (+) sign next to the configuration. In the Navigation pane 14, the user may click the plus (+) sign next the component containing the device for which he or she wants to view the OEM information. Under the component, the user may select the device for which he or she wants to view the OEM information, and the device controls may be displayed in the Control pane 22. In the Control pane 22, the user may select a "Description" tab to view the OEM information, as shown in FIG. 7(D). The user may not able to edit the OEM information from this page.

Although each device has different OEM information, the most common information displayed is shown in Table 3.

TABLE 3

| Information | Summary |
|---|---|
| ID | Unique identifier for this device |
| Manufacturer | Manufacturer of the device |
| Manufacturer URL | Manufacturer's URL |
| Model Name | Name of this specific device model |
| Model Number | Number of this specific device |
| Model URL | URL of website pertaining specifically to this device product |
| Persentation URL | URL of a website that contains presentation markup |
| UPC | Universal Price Code (If applicable) |
| Serial Number | Serial Number on this device |
| Firmware Version | Version of firmware installed on this device |

Device Control Groups

For certain control categories such as lighting, audio, shades, thermostats, ovens, and contact closures, the user may be able to group devices within the same component into a device control group. According to the invention, all of the devices in a control group may be controlled as a single device using the feedback provided by one device in the group that the user designates as the master device. In fact, device control groups may be configured to look just like a single device in the menu. When the user makes a change to a control group's settings, all of the device in that group may be affected.

Figure 8A:
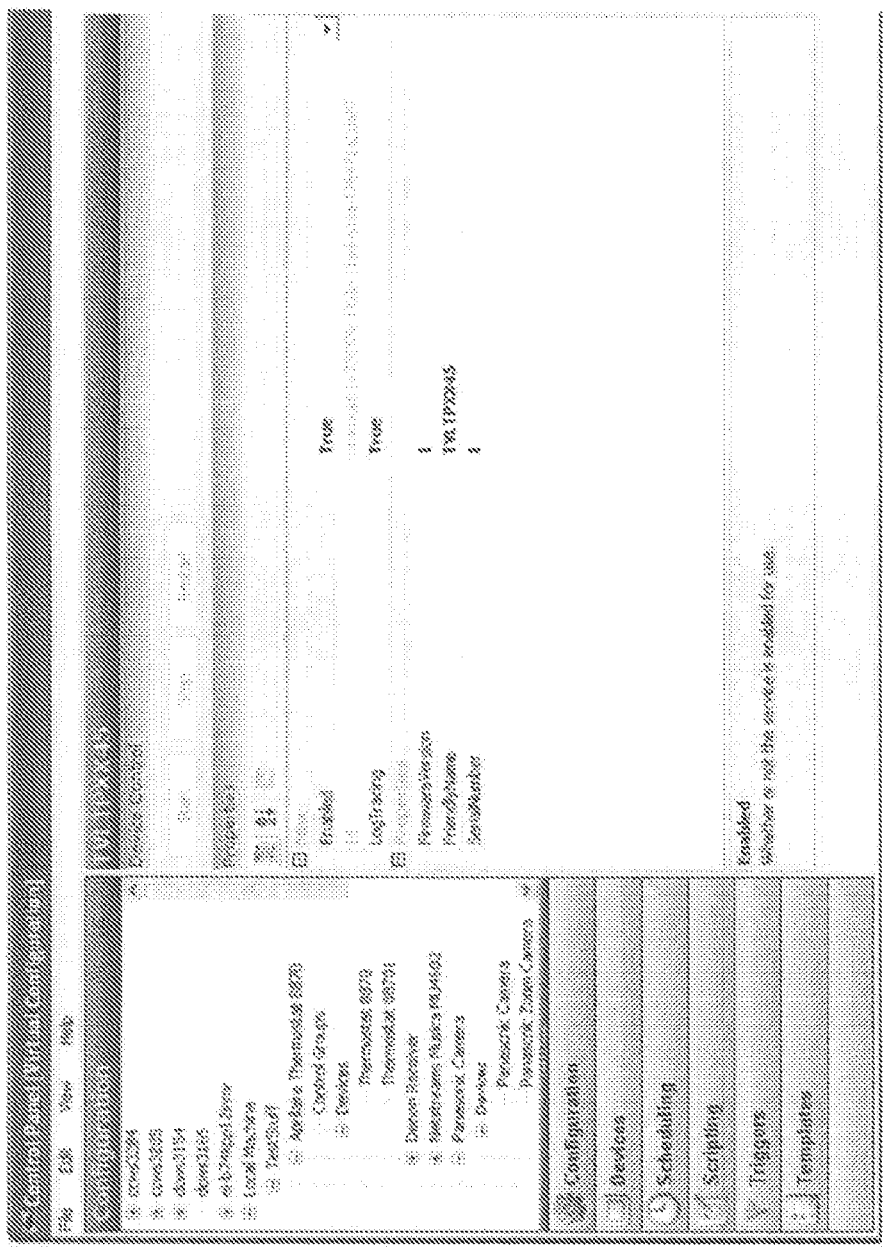
FIGS. 8(A) and 8(B) show screen capture images of the control panel of FIG. 2 being used for adding and editing a device control group, respectively.

To set up a device control group, the user may need to have components with devices already defined in the configuration. In the control panel 10, the user may access a component which supports device control groups, select a "Device Control Group" option, give the control group a "Friendly Name," select the devices to include, set parameters for the devices, and designate a master device. To create a device control group, as shown in FIG. 8(A), the user may select, in the Navigation pane 14, select the desired configuration and then click the (+) sign beside the name of the component containing the devices he or she wants to group together. Then, the user may select the "Control Groups" option and select "New," and then select the option that may appear highlighted. In the Control Group pane, the user may type in the "Friendly Name." For "Enabled," the user may select "True" to enable the device control group. For "Log Tracing," the user may select "True" to allow logging. For "Manipulation," the user may select either "Relative" or "Absolute." The user may be viewing the state of the master device when he or she accesses the control group to change its state. If the user wants the other devices to follow the master device exactly, he or she may select "Absolute." If the user wants the other devices to change based on their current state, the user may select "Relative," and the other devices may incrementally change to the same degree that he or she changes the master device. In the "Devices" field, the user may click the down arrow to access a devices choice list, and select the checkbox beside the names of the devices he or she wants to group together. For "Master," the user may click the down arrow to access the choice list of devices. The user may select the checkbox beside the name of the device he or she wants to be the master device for this group.

Figure 8B:
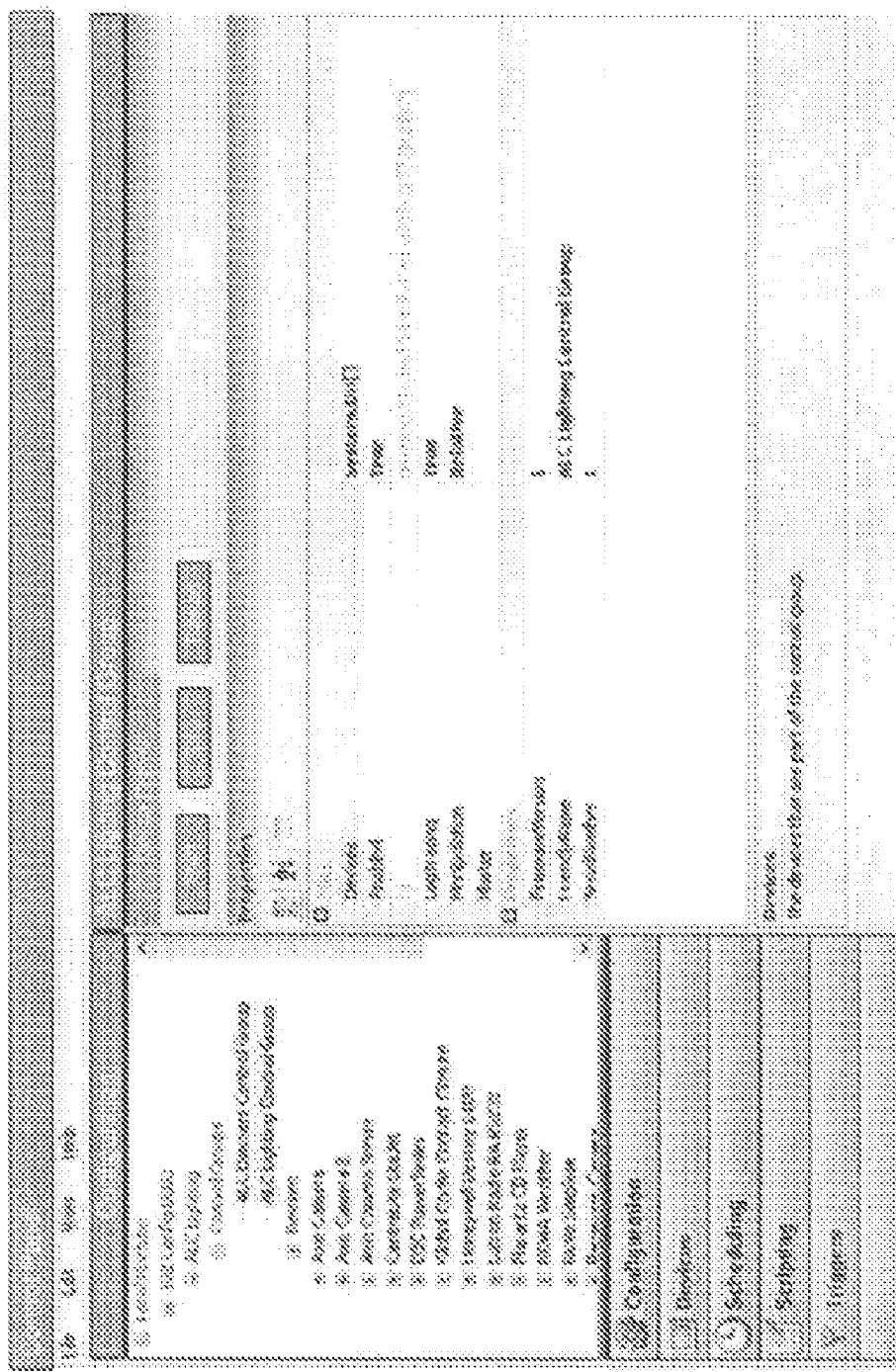

To edit a device control group, the user may select the "Configuration" in the functional area panel 16. In the Configuration pane, the user may select the desired configuration and then click the (+) sign beside the name of the component containing the device control group to be edited, as shown in FIG. 8(B). Then, the user may select the "Control Groups" option and select the control group to edit, and the settings for that control group may appear on the screen. In the Control Group pane, the user may type in the "Friendly Name." For "Enabled," the user may select "True" to enable the device control group. For "Log Tracing," the user may select "True" to allow logging. For "Manipulation," the user may select either "Relative" or "Absolute." The user may be able to view the state of the master device when he or she accesses the control group to change its state. If the user wants the other devices to follow the master device exactly, he or she may select "Absolute." If the user wants the other devices to change based on their current state, he or she may select "Relative," and the other devices may incrementally change to the same degree that the user changes the master device. In the Devices field, the user may click the down arrow to access the devices choice list, and select the checkbox beside the names of the devices he or she wants to group together. For "Master," the user may click the down arrow to access the choice list of devices. The user may select the checkbox beside the name of the device he or she wants to be the master device for this group.

Servers

The Servers pane 25 may show all of the servers (i.e., service providers) on the network. If the user has a complex installation, he or she may have several servers listed. Otherwise, less complex installations may have only one or two servers listed. The list of servers may be built dynamically from network information when the user starts the control panel 10. The user may not be able to add a server or delete a server from the list in the Servers pane 24. The user may, however, be able to choose which servers to display in the Navigation pane for better control over the amount of information and devices listed in the Navigation at one time. This may be useful in complex installations with several servers and hundreds of devices, which could cause the contents of the Navigation pane to become unwieldy.

To view the servers on the network, the user may select "Configuration" in the functional area pane 16. In the Servers pane 24, the user may select the name of the server he or she wants to view in the Navigation pane 14, and then the server may be displayed in the Navigation pane 14, thereby enabling the user to add, edit, or delete the configurations on the server. If the Servers pane 24 displays, but the user does not want the Severs pane 24 to display, he or she may be able to hide the Servers pane 24. To hide the Servers pane 24 in the control panel 10, the user may select "View" and "Servers" from the menu bar 12. Then, the Servers pane 24 may no longer be displayed in the control panel 10. If the Servers pane 24 is not displayed and the user wants to display the Servers pane 24, the user may change the setting to display the Servers pane 24. For example, to display the Servers pane 24 in the control panel, the user may select "View" and "Servers" from the menu bar 12. A check mark may be displayed next to "Servers" and the Servers pane 24 may be displayed in the control panel 10.

Scripts

To create a script in the control pane, the user may use either the C # or Visual Basic programming language. Otherwise, the user may use a non-programming interface configuration tool to create scripts. A script may be a string of commands that sends action to a variety of devices for a predetermined effect. Using a script, the user may be able to simultaneously control different types of devices. For example, the user may have a script that sends a command to turn on the lights in the foyer, lower the audio volume, and then ramp up the temperature on the thermostat. Scripts may be triggered either manually (i.e., button activated) or automatically (i.e., scheduled).

The user may only be able to create a script only after he or she adds all of the components and devices to a configuration. If the user changes a component or device after the script is created, the user may need to change the script to reflect the change. In creating a script, the user may create commands, which are instructions that he or she wants the CAS to follow. A command may consist of an action and the action properties. An action may specify what the user wants to happen and the action properties may specify how the user wants the action to occur. For example, bringing a light up to 50 percent brightness may involve the action of bringing the light up and the action property of 50 percent. Scripts may run in the order that the commands display in the script itself.

Before creating a script, the user may need to add the components and devices that he or she wants to use in the script to the configuration that the user is adding the script to. If the user changes a component or device, or adds a new component that he or she wants to add to the script, the user may edit the script to reflect the changes. The user may add only one action to a command at a time and only one command to a device at a time. If the user wants to make a device dr more than one action, he or she may need to break the action into single actions. For example, if the user wants a thermostat to set to 70 degrees and turn the fan on, he or she may need to create two separate commands: one for the thermostat to be set to 70 degrees and then a second command for the thermostat to turn on the fan. These separate commands may be displayed in the script as separate items.

Figure 9:
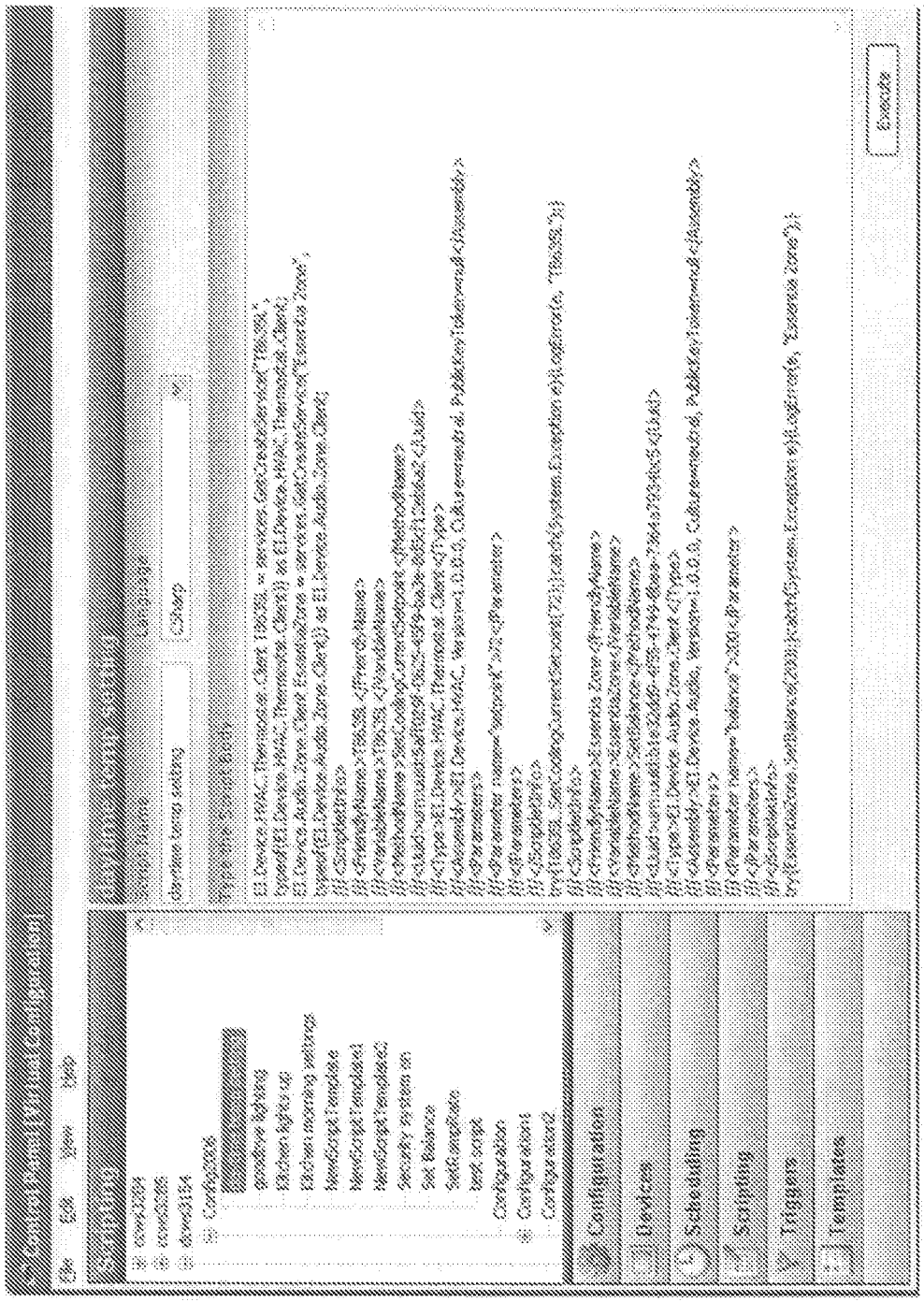
FIG. 9 shows a screen capture image of the control panel of FIG. 2 being used for creating a script.

To create a script, the user may select "Scripting" from the functional area pane 16. In the Servers pane 24, the user may click the name of the server that contains the configuration that he or she wants to add a script, and the server may be displayed in the Navigation pane 14. In the Navigation pane 14, the user may click the plus (+) sign next to the server name containing the configuration that he or she wants to add a script to. In the Navigation pane 14, the user may select the name of the configuration that he or she wants to add a script to, and select click "New" and "Script Template." In the Navigation pane 14, the script may be added under the configuration name and the "New Script template" may be displayed in the control pane 22, as shown in FIG. 9. In the Control pane 22, under "Script Name," the user may highlight the field value and type a new script name, which may be descriptive and unique for easier administration. Under "Language," the user may select the programming language to use for the script from the drop-down list, either C# or VisualBasic™. Under "Type the Script Body," the user may type the script in the previously selected programming language. After adding all information to the script, the user may save the configuration. The user may now be able to schedule the script to run automatically, or run the script manually, depending on the situation.

After creating a script, the user may test the script before placing it into operation. This will ensure that the devices are working as expected and the sequence of the commands is correct in the script. To test a script, after selecting "Script" from the functional area pane 16, the user may, in the Servers pane 24, select the name of the server that contains the configuration containing the script to test. The server may be displayed in the Navigation pane 14. In the Navigation pane 14, the user may click the plus (+) sign next to the server name containing the configuration containing the script to test. In the Navigation pane 14, the user may click the plus (+) sign next to the name of the configuration containing the script to test. In the Navigation pane 14, the user may click the name of the script to test, and the script information may be displayed in the Control pane 22. Then, the user may click the "Execute" button in the lower right of the Control pane 22, as shown in FIG. 9. If the devices are all working correctly and the script is written correctly, the devices may well be controlled by the script. If the script works properly, but continuously fails at the same spot, it may necessary to verify that the device that fails is installed and configured correctly, and that the script actions are appropriate for the device.

To edit a script, the user may select "Scripting" from the functional area pane 16. In the Servers pane 24, the user may select the name of the server that contains the configuration containing the script to edit, and the server may be displayed in the Navigation pane 14. In the Navigation pane 14, the user may click the plus (+) sign next to the server name containing the configuration containing the script to edit. In the Navigation pane 14, the user may click the plus (+) sign next to the name of the configuration containing the script to edit. In the Navigation pane 14, the user may click the name of the script to edit, and the script information may be displayed in the Control pane 22. In the Control pane 22, under "Script Name," the user may highlight the field value and type the new script name. The user may make this script name descriptive and unique for easier administration. The user may need to avoid selecting a different programming language under "Language" to use for the script from the drop-down list. If the user selects a different language, the existing script code may be deleted. Under "Type the Script Body," the user may make changes to the script in the previously selected programming language. After saving the configuration, the user may schedule the script to run automatically, or run the script manually, depending on the situation.

To delete a script, the user may select "Scripting" from the functional area pane 16. In the Servers pane 24, the user may select the name of the server that contains the configuration containing the script to delete, and the server may be displayed in the Navigation pane 14. In the Navigation pane 14, the user may click the plus (+) sign next to the server name containing the configuration containing the script to delete. In the Navigation pane 14, the user may click the plus (+) sign next to the name of the configuration containing the script to delete. In the Navigation pane 14, the user may select the name of the script to delete and confirm the deletion.

Triggers

The user may identify a specific device status and condition as a trigger to automatically execute a "scene" when it occurs.

Figure 10A:
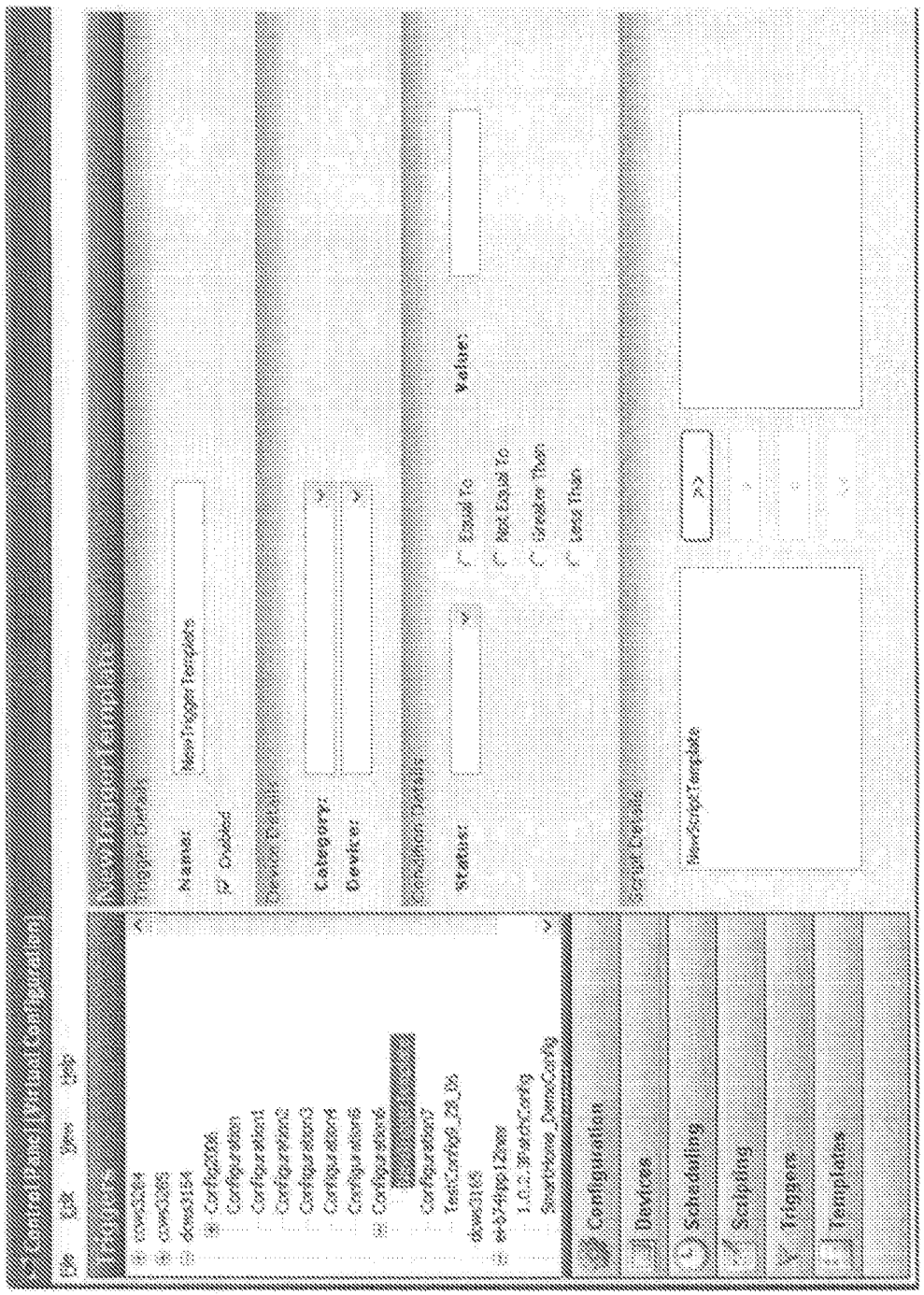
FIGS. 10(A) and 10(B) show screen capture images of the control panel of FIG. 2 being used for creating and editing a trigger, respectively.

A scene is the operation or script for a particular situation. One trigger may execute multiple scripts. However, only one trigger may be used per script. Possible status and conditions may differ depending on the type of device and include "greater than," "less than," "equal to," and "not equal to." For example, if a dimmer's load level (i.e., status) is set to "greater than" condition 50%, a scene may be automatically executed. To create a trigger for a script, the user may select "Triggers" from the functional area pane 16, which may open a new trigger template pane in the control pane 22, as shown in FIG. 10(A). The, the user may, under "Trigger Details," type in a friendly name if the trigger, and select "Enabled" to enable the trigger. Under "Device Details," in the "Category" field, the user may select the down arrow to access the Category choice list and select the category of device he or she wants. In the "Devices" field, the user may click the down arrow to access the choice list of devices, and select the name of the device that will trigger the script. Under "Condition Details," in the "Status" field, the user may select the down arrow to view the Status choice list, and select the desired status then select the "Condition" (i.e., greater than, less than, equal to, or not equal to) to be net. Form the "Values" choice list, the user may select the "Value" or adjust to the desired value. Under "Script Details," the user may select a script to execute from the choice list of scripts in the left column, and select the right arrow to move the script into the right column. This script may be the first to execute when the condition the user specified is net. If the user wants this condition to trigger to execute multiple scripts, the user may repeat this step for each script you want the trigger to execute, in the order he or she wants the scripts to execute.

Figure 10B:
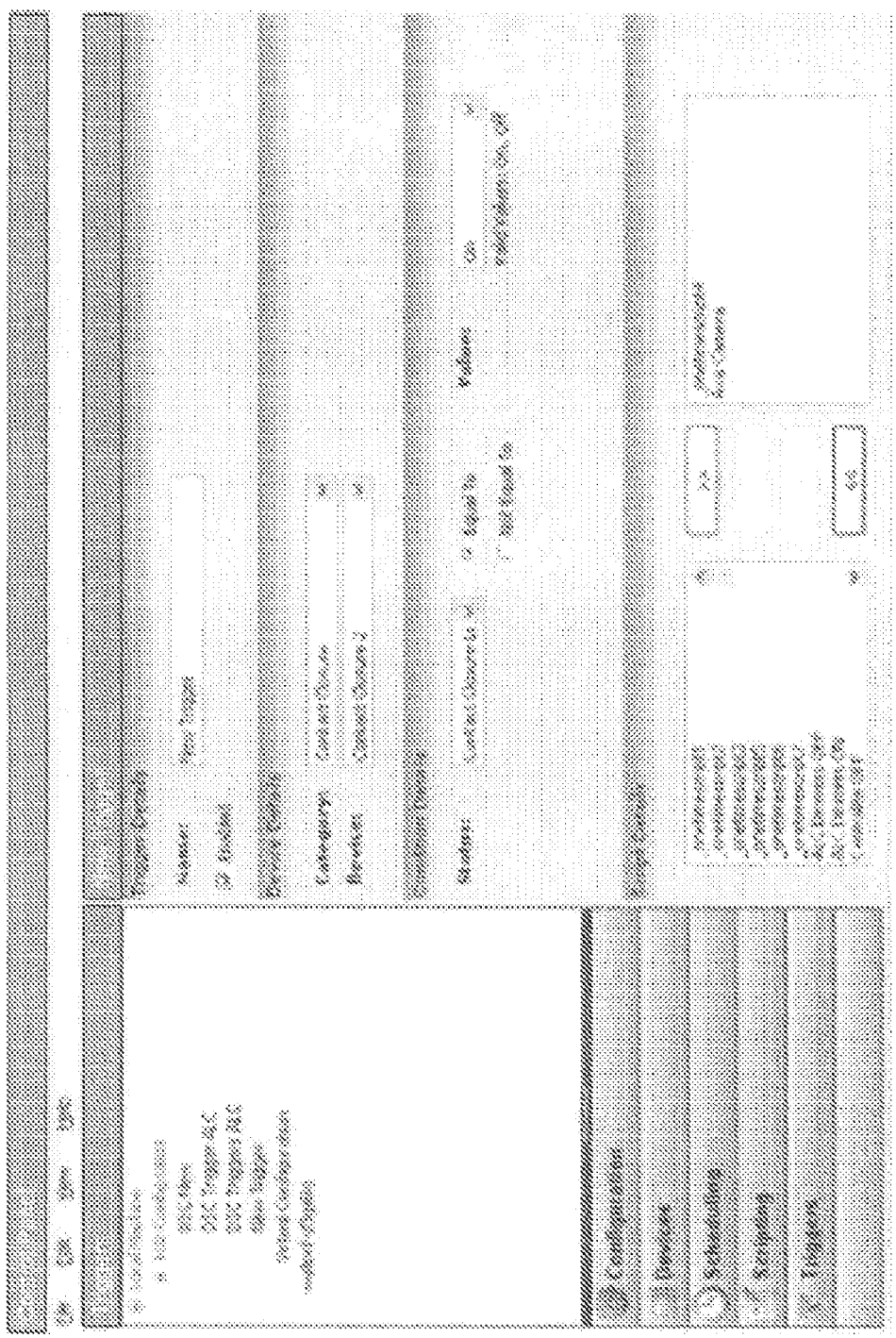

To edit a trigger for a script, the user may select "Triggers" in the functional area pane 16. In FIG. 10(B), the user may select the machine (i.e., service provider), configuration, and the trigger to edit. In the Trigger pane, under "Trigger Details," the user may edit the desired parameters for the trigger, and select "Enabled" to enable the trigger. Under "Device Details," in the "Category" field, the user may click the down arrow to access the Category choice list and select the category of device he or she wants. In the "Devices" field, the user may click the down arrow to access the choice list of devices, and select the name of the device that will trigger the script. Under "Condition Details," in the "Status" field, the user may click the down arrow to view the Status choice list, select the desired "Status," then select the "Condition" (i.e., greater than, less than, equal to, or not equal to) to be net. From the "Values" choice list, the user may select the "Value" or adjust to the desired Value. Under "Script Details," the user may select a script to execute from the choice list of scripts in the left-hand column, and select the right arrow to move the script into the right column. To move scripts out of the right hand list, the user may select the script and then the left arrow to remove the script from he list. Scripts may execute in the order they appear in the list. Thus, the user may need to use the left and right arrows to move scripts around in the list.

Schedules

Schedules are time periods in which a script is to run. A schedule may consist of a schedule type (e.g., start time and date, or day) and an action (i.e., script to run). Before creating a schedule, the user may need to add the components and devices to the configuration and create the script that he or she wants to run on the schedule the user is creating. The user may not need to create a schedule for each script immediately after creating the script. The use may add a schedule to any script that he or she creates at any time. The user may have multiple schedules associated with the same script.

Figure 11B:
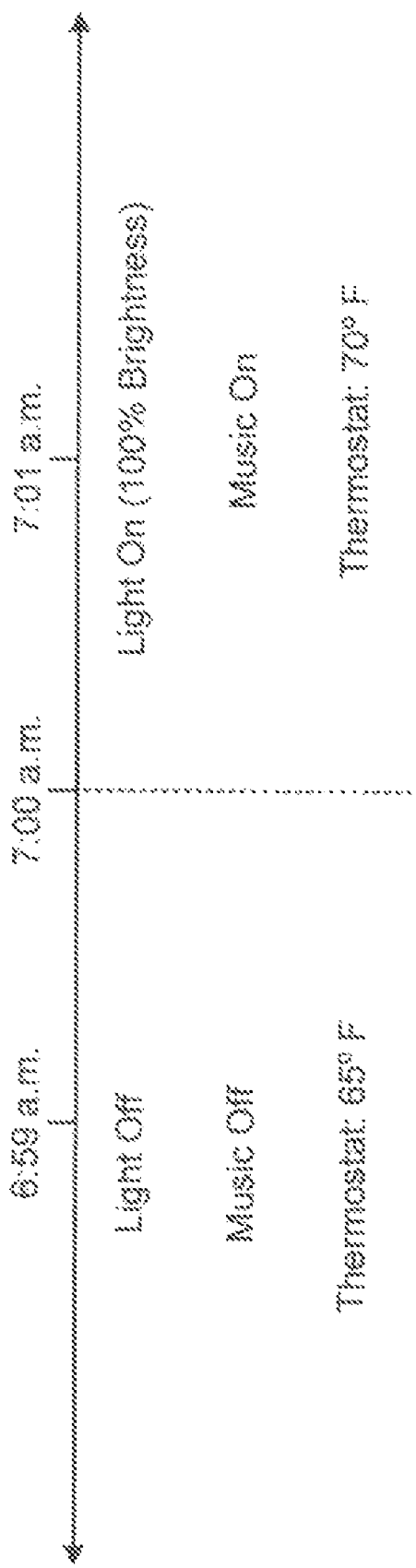
FIG. 11(B) shows a timing line showing how the schedule script shown in FIG. 11(A) operates as a function of time.

Types of schedules include Daily (i.e., Schedule runs every day at the time specified)., Weekly (i.e., Schedule runs one time a week on the specified day and at the time specified, Monthly (i.e., Schedule runs one time a month on the specified date and at the time specified), One Time (i.e., Schedule runs one time only on the specified date and at time specified) and/or the like. FIGS. 11(A) and 11(B) show how scripts and schedules work together, in which a script involving a light, audio and thermostat are scheduled to be activated daily at 7:00 a.m. If the user wants to have a schedule run every other day, or only four days out of the week, he or she may need to set up individual schedules for the script to run. For example, if the user wants a script to run on Tuesday, Wednesday, and Friday, he or she may set up three separate weekly schedules, one schedule for Tuesday, one for Wednesday, and one for Friday. The user may create a new schedule for each script that he or she creates for a configuration. In addition, when the schedules change, the user may easily edit the schedules to meet the user's requirements.

Figure 11C:
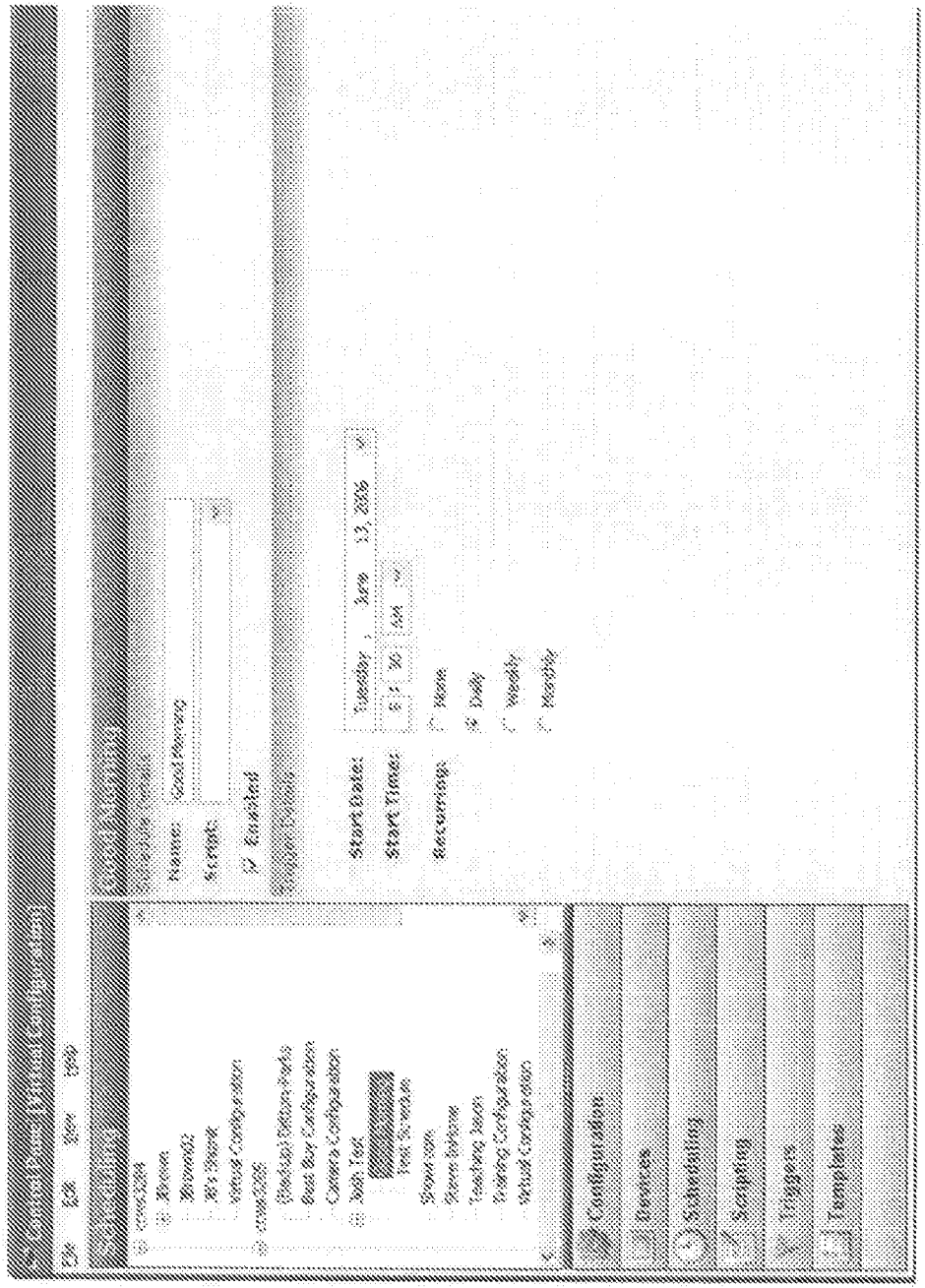
FIG. 11(C) shows a screen capture image of the control panel of FIG. 2 being used for creating a Schedule.

To create a schedule, the user may select "Schedules" in the functional area pane 16. In the Servers pane 24, the user may click the name of the server that contains the configuration containing the script he or she wants to schedule, and the server may be displays in the Navigation pane 14. In the Navigation pane 14, the user may click the plus (+) sign next to the server name containing the configuration that contains the script to be scheduled. In the Navigation pane 14, the user may select the name of the configuration containing the script to be scheduled and select "New" and "Schedule." In the Navigation pane 14, the user may select the name of the schedule he or she just added, and the schedule information may be displayed in the Control pane 22, as shown in FIG. 11(C). In the Control pane 22, under "Schedule Details," the user may, in the "Name" field, highlight the value and type the new name for the schedule. The name may be unique, brief, and descriptive of the schedule, such as "Good Morning." In the Script field, the user may select the script to run on the schedule from the list. The user may need to have at least one script in the configuration before adding a schedule. If the list in the Script field is blank, the user may need to create the script to schedule before scheduling the script. After creating the script, the script may be displayed in the Script field list. Under "Trigger Details," in the "Start Date" field, the user may select the date for the schedule to start from the drop-down list. In the "Start Time" field, the user may type the hour and minutes for the schedule to start, preferably in the format of "hh:mm" and then select AM (morning) or PM (evening) from the list. In the "Recurring" field, the user may select one of the options shown in Table 4 that he or she wants to use with this schedule. After completing all of the schedule settings, the user may save the configuration.

TABLE 4

| Recurring Option | Description |
| --- | --- |
| None | Schedule does not recur. This is a one-time only schedule. |
| Daily | Schedule runs every day at the same time. |
| Weekly | Schedule runs weekly on the same day of the week and at the same time. |
| Monthly | Schedule runs monthly on the same day of the month and at the same time. |

To edit a schedule, the user may select "Scheduling" in the functional area pane 16. In the Servers pane 24, the user may select the name of the server that contains the configuration containing the schedule to be edited, and the server may be displayed in the Navigation pane 14. In the Navigation pane 14, the user may click the plus (+) sign next to the server name containing the configuration that contains the schedule to be edited. In the Navigation pane 14, the user may click the name of the configuration containing the schedule to be edited. In the Navigation pane 14, the user may click the name of the schedule to be edited, and the schedule information may be displayed in the Control pane 22, as shown in FIG. 11(C). In the Control pane 22, under "Schedule details," in the "Name" field, the user may highlight the value and type the new name for the schedule. The name may be unique, brief, and descriptive of the schedule. In the "Script" field, the user may select the script to run on the schedule from the list. The user may need to have at least one script in the configuration prior to adding a schedule. If the list in the Script field is blank, the user may need to create the script to schedule before scheduling the script. After creating the script, the script may be displayed in the Script field list. Under "Trigger Details," the user may need, in the "Start Time field," to type the hour and minutes for the schedule to start in the format such as "hh:mm" and then select AM (morning) or PM (evening) from the list. In the "Recurring" field, the user may select one of the options described in Table 4 that he or she wants to use with this schedule. After completing all of the schedule settings, the user may save the configuration.

To delete a schedule, in the Servers pane 24, the user may select the name of the server that contains the configuration containing the schedule to delete, and the server many display in the Navigation pane 14. In the Navigation pane 14, the user may click the plus (+) sign next to the server name containing the configuration that contains the schedule to delete. In the Navigation pane 14, the use may click the plus (+) sign next to the name of the configuration containing the schedule to delete. Then, the user may select the name of the schedule to delete and select "delete." Upon confirming a delete verification message, the schedule may be deleted from the configuration. The script may still remain and may not be impacted by the schedule deletion. If the user wants to run the script, he or she may need to either create a new schedule to run the script automatically or run the script manually.

Services

Each device configuration page may contain Stop, Start, and Restart buttons in the Device Control area of the Control pane 22. Using these buttons, the user may stop, start, or restart the device—specific portion of the software that enables control of the device. This may be useful when the user changes a device configuration and needs to restart the service before the new configuration can be used.

Figure 12A:
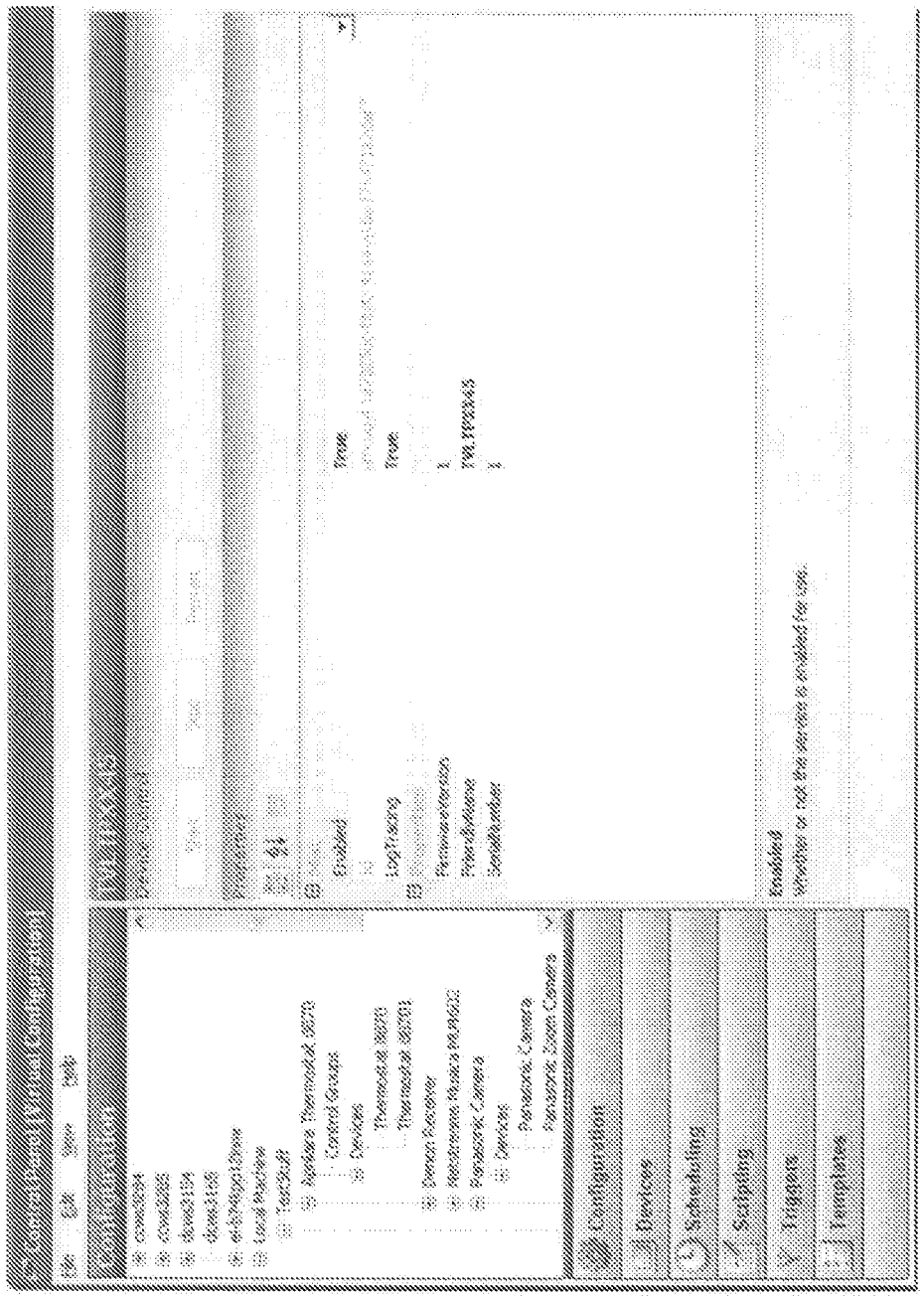
Figure 12B:
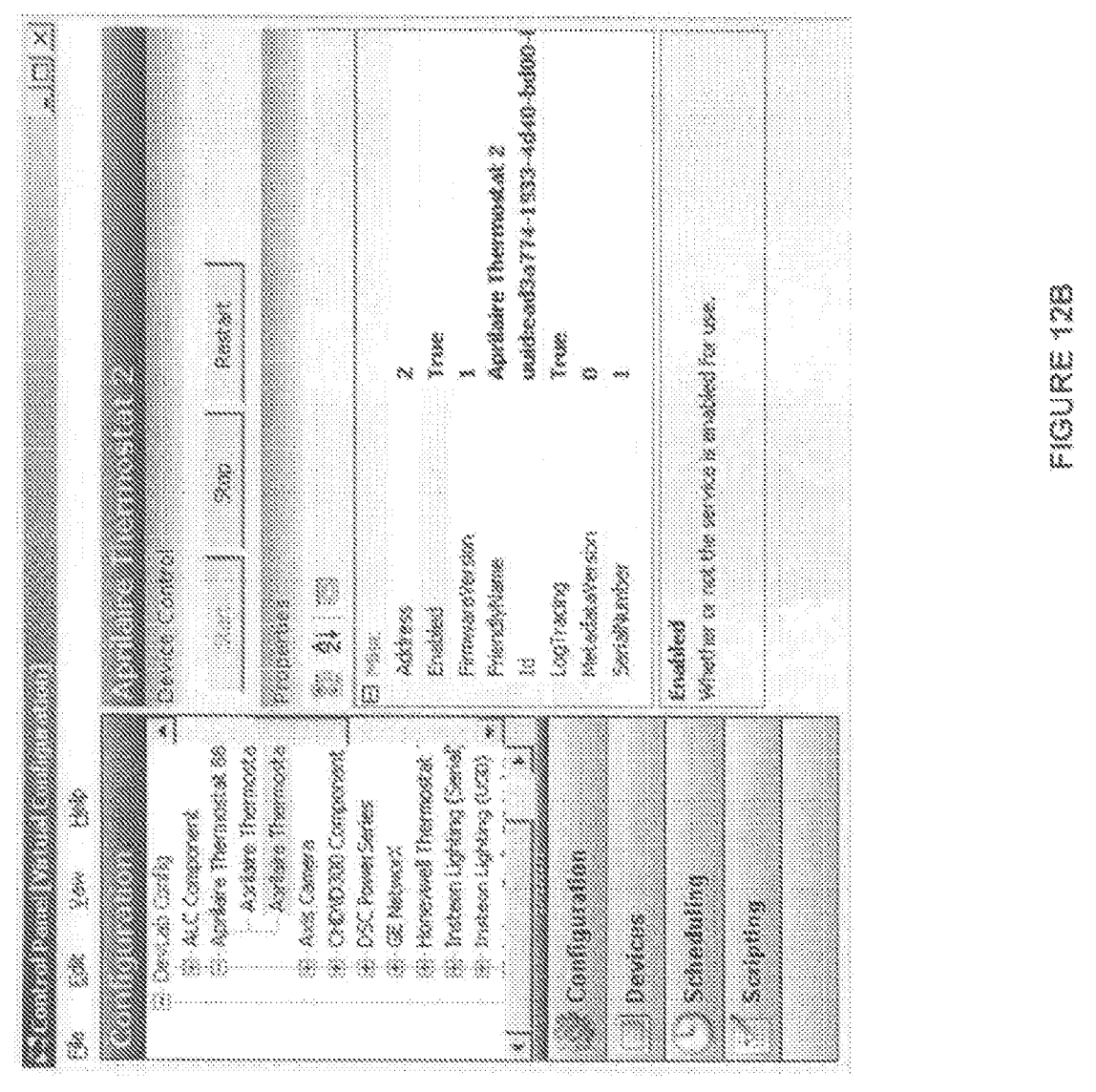

To start a service, the user may select "Configuration" from the functional area pane 16. In the Servers pane 24, the user may select the name of the server that contains the configuration containing the device he or she wants to start, and the server may be displayed in the Navigation pane 14. In the Navigation pane 14, the user many click the plus (+) sign next to the server name containing the configuration that contains the device to start and then click the plus (+) sign next to the configuration. In the Navigation pane 14, the user may click the plus (+) sign next the component containing the device to start. Under the component, the user may select the device to start, and the device settings may be displayed in the Control pane 22, as shown in FIG. 12(A). In the Control pane, under Device Control, the user may click "Start" and then "Close" in the Service Control window, which may start the service.

To stop a service, the user may select "Configuration" from the functional area pane 16. In the Servers pane 24, the user may select the name of the server that contains the configuration containing the device to stop, and the server may display in the Navigation pane 14. In the Navigation pane 14, the user may click the plus (+) sign next to the server name containing the configuration that contains the device to stop, and then click the plus (+) sign next to the configuration. In the Navigation pane, the user may click the plus (+) sign next the component containing the device to stop. Under the component, the user may select the device to stop, and the device settings may be displayed in the Control pane 22. In the Control pane 22, under Device Control, the user may click "Stop" and "Close" in the Service Control window, which may stop the service.

To restart a service, the user may select "Configuration" from the functional area pane 16. In the Servers pane 24, the user may select the name of the server that contains the configuration containing the device to restart, and the server may be displayed in the Navigation pane 14. In the Navigation pane 14, the user may click the plus (+) sign next to the server name containing the configuration that contains the device to restart, and then click the plus (+) sign next to the configuration. In the Navigation pane 14, the user may click the plus (+) sign next the component containing the device to restart. Under the component, the user may select the device to restart, and the device settings may be displayed in the Control pane 22, as shown in 12(B). In the Control pane 22, under Device Control, the user may select "Restart" and then "Close" in the Service Control window, which may restart the service.

Templates

Templates may be used to create device interfaces for non-certified devices, such as, for example, CD player, DVD player, audio receiver, display (e.g., T.V., monitor) and the like. You can use either IR or one-way serial communication to control these devices. CD players may be configured as sources that can be controlled through the CAS and used in the scenes. DVD players, audio receivers and displays may also be used in scripts although they may not be fully controlled individually in the CAS. Once the user establishes the set of commands that the component supports, he or she may send the command directly to the device via the CAS. If no user interface exists for the devices, the user may not be able to add the devices to the menu structure. However, if the CAS can support those devices, the user may be able to add those components to the menu structure. After completing the Template setup, the next step may be to add scripts to access the component via the CAS or add to Menu.

Figure 13A:
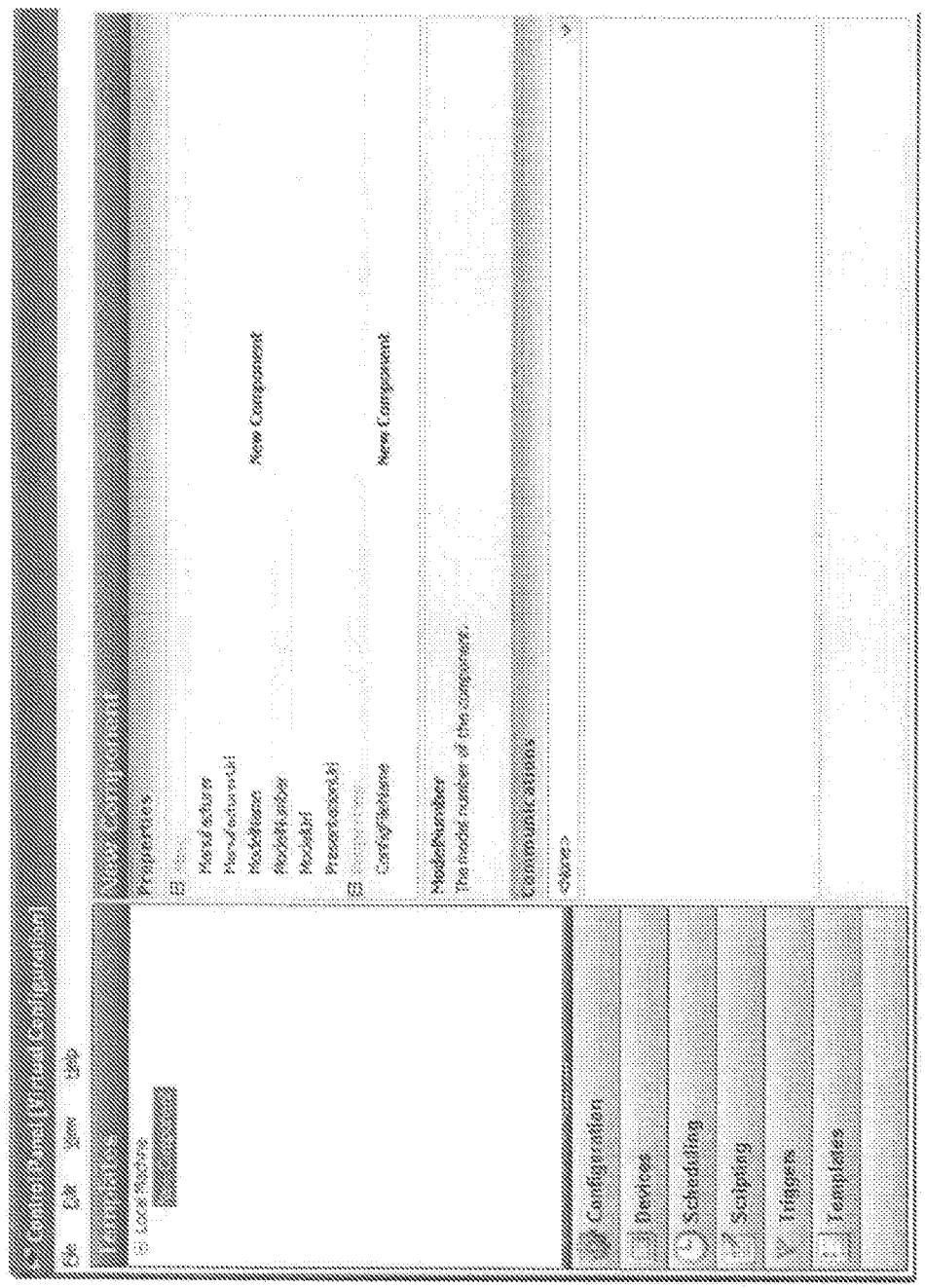
FIGS. 13(A), 13(B), 13(C), 13(D), 13(E) and 13(F) show screen capture images of the control panel of FIG. 2 being used for setting up a new template.
Figure 13B:
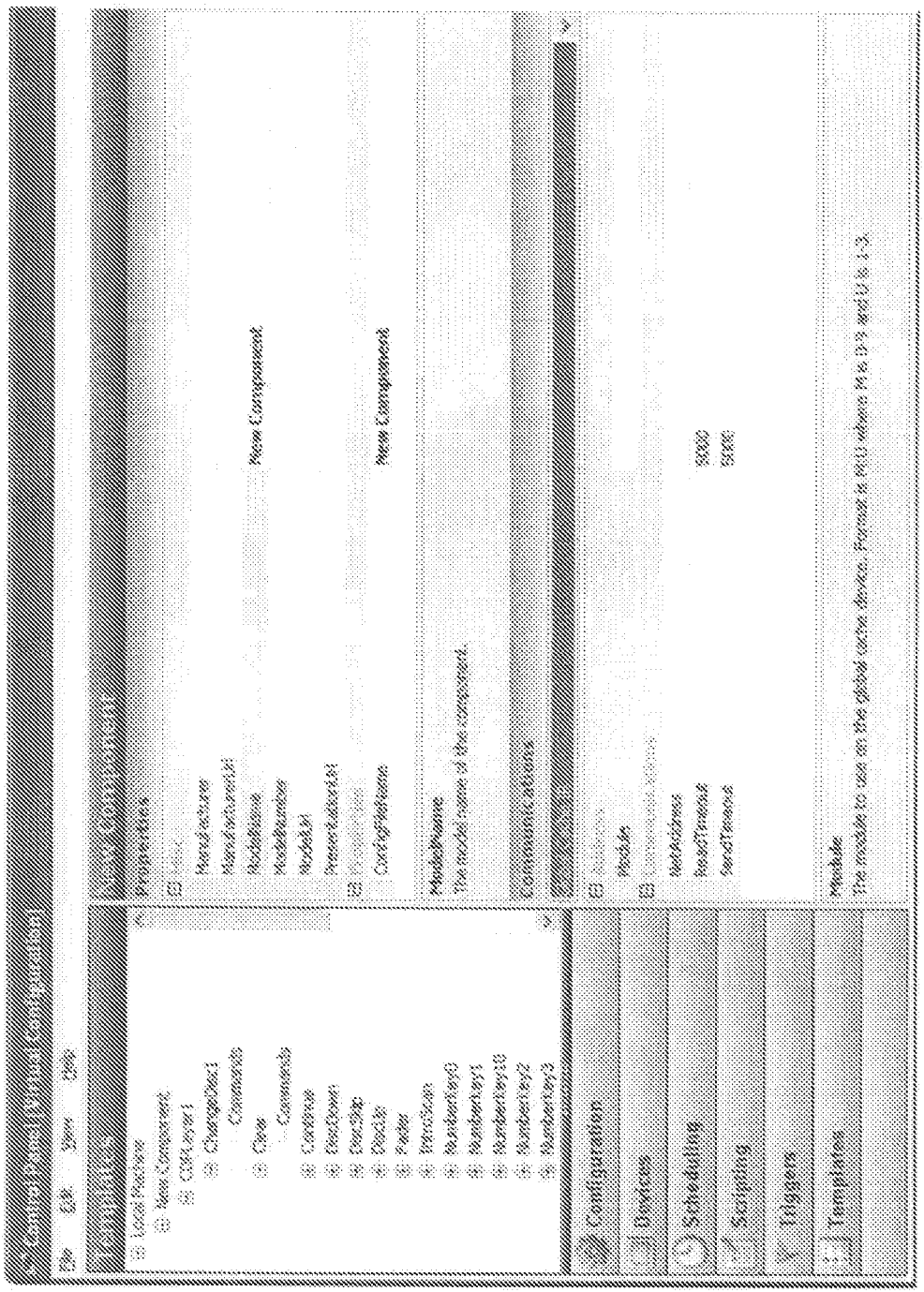
Figure 13C:
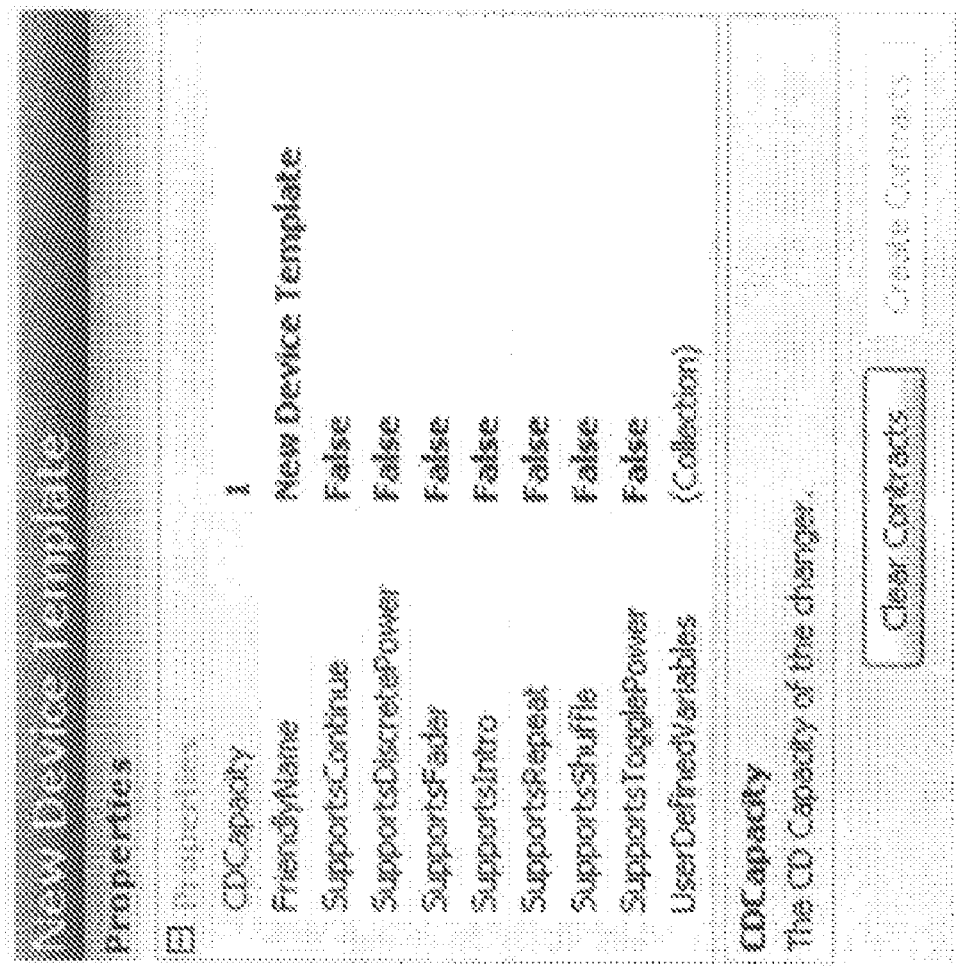
Figure 13D:
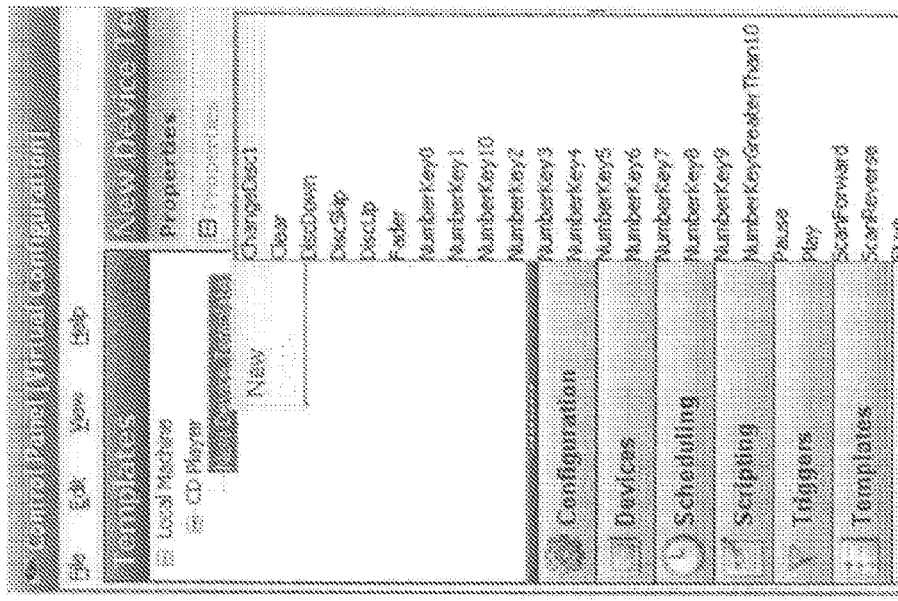
Figure 13E:
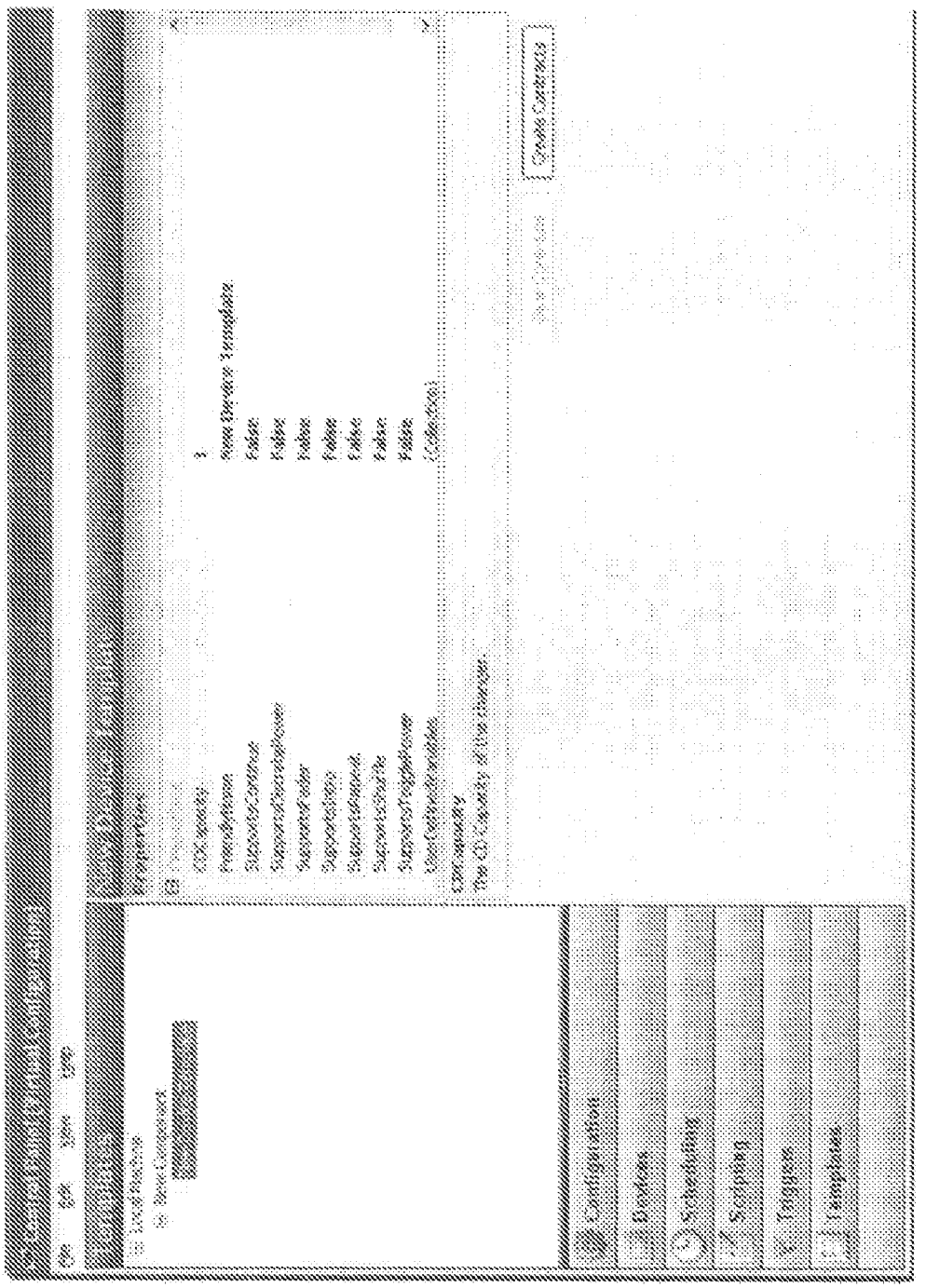
Figure 13F:
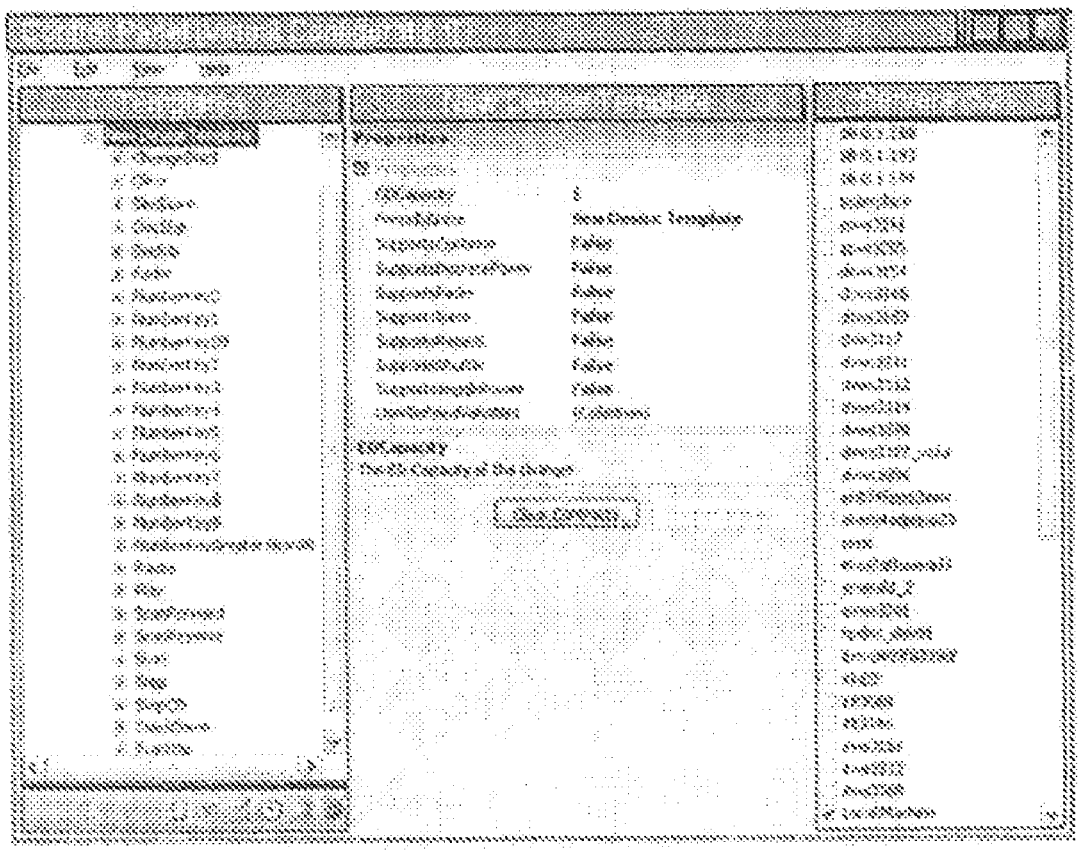

To set up a new template, the user may select "Templates" from the functional area pane 16, then select "Edit," "New" and "Component Template" from the menu bar 12, a shown in FIG. 13(A). The user may enter the new component properties and select the type of communication to use with this component (e.g., either IR or serial port), as shown in FIG. 13(B). Then, the user may select "Edit" and "New" from the menu bar 12 and select the type of device template to create, which causes the control panel 10 to populate the default properties of the template according to the type of the selected device. The user may enter the properties of the new device and create a catalogue of commands, as shown in FIG. 13(C). There may be two possible methods to use to create the command set. As shown in FIG. 13(D), the first method may follow the procedure for incorporating new devices. The user may select the new device template, and by hovering over "New," and "Command" options may become available. Then the user may select the desired "Command." In using this method, the user may need to configure commands one by one. In FIGS. 13(E) and 13(F), the second method may involve the "Properties" and "Create Contracts" button. After specifying which properties are supported by the device, the user may select the "Create Contracts" button, and the system may automatically create a catalogue of commands based on the properties supported.

Figure 14A:
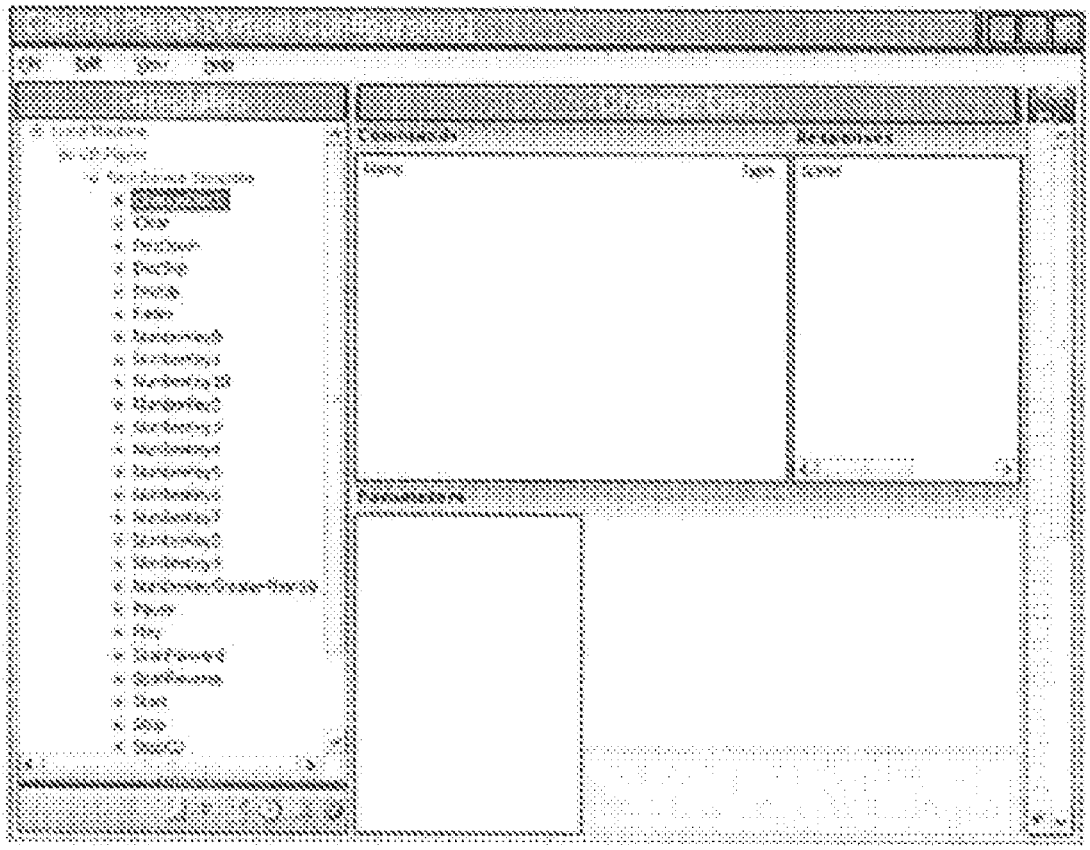
FIGS. 14(A), 14(B), 14(C) and 14(D) show screen capture images of the control panel of FIG. 2 being used for defining a command in setting up a new template.
Figure 14B:
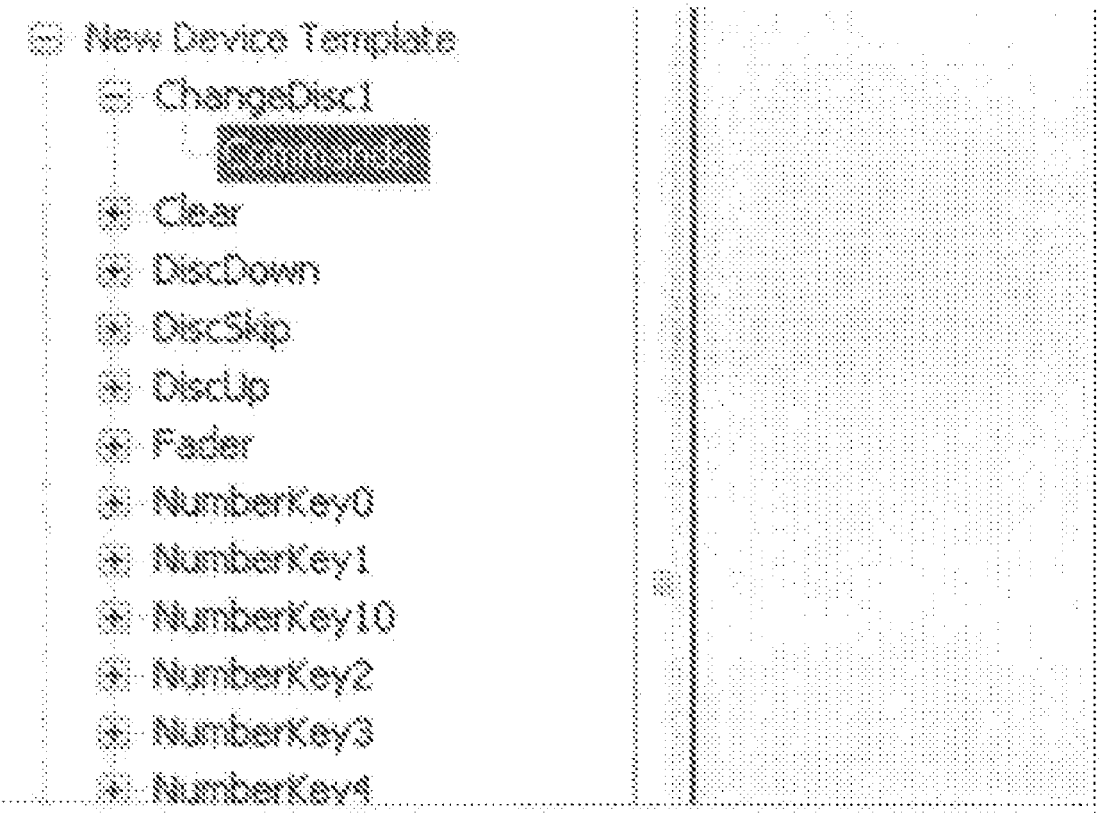
Figure 14C:
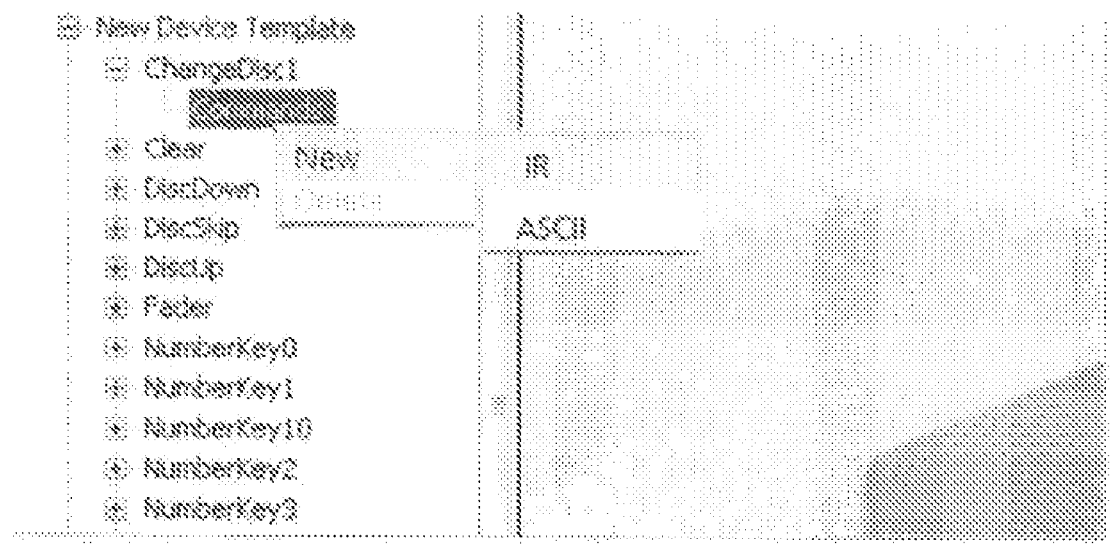
Figure 14D:
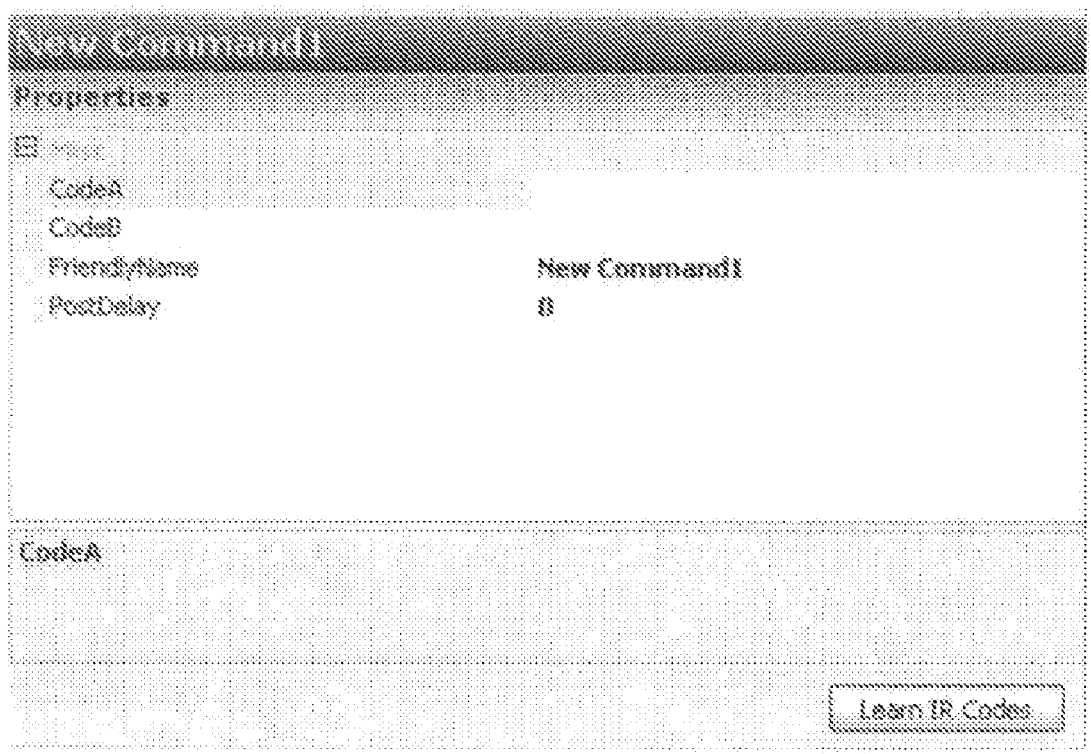

Using either of the previous methods, the user may create the command catalog, and then define the commands by selecting the expandable tree menu for the individual command as shown in FIGS. 14(A) and 14(B), selecting the menu for the individual command, and select the correct communication for the particular command (e.g., IR or ASCII), as shown in FIG. 14(C). The IR commands may be transmitted through an IR bug and the ASCII commands may be delivered through a serial connection. Failure to choose the correct command type may result in an unresponsive device. If an IR learner is available, the user may select "Learn IR Codes" as shown in FIG. 14(D). The IR leaner may need to be connected to an available serial port on the local machine. The control panel 10 may guide the user through the process of learning the IR codes by text in the box above the "Learn IR Codes" button. Once the codes are added, the user may save the new component and add it to the configuration. Then, the user may select "Configuration" in the functional area pane, select the active configuration and select the new component by friendly name. The user may need to check the configuration setting specified for the template and select "Save." To test the command catalog, the user may select "Start" on the component and verify that the service starts, and the device may be available to test under Devices. Then the user may be able to incorporate the devices into CAS using scripting commands.

Figure 15A:
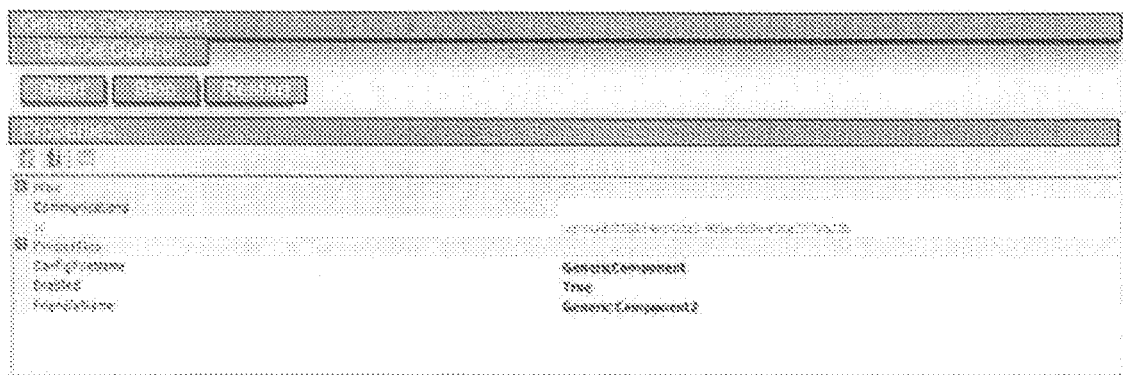
FIGS. 15(A), 15(B) and 15(C) show screen capture images of the control panel of FIG. 2 being used for adding a new template to a configuration and testing functionality thereof.
Figure 15B:
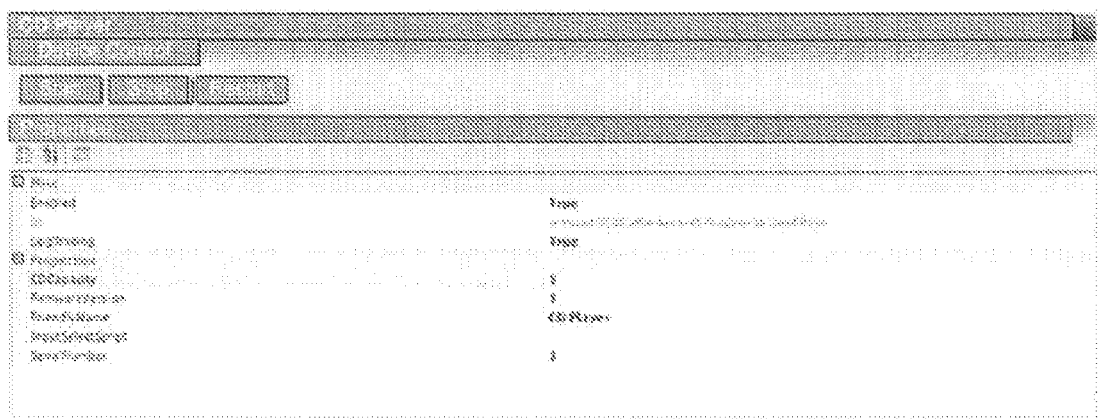
Figure 15C:
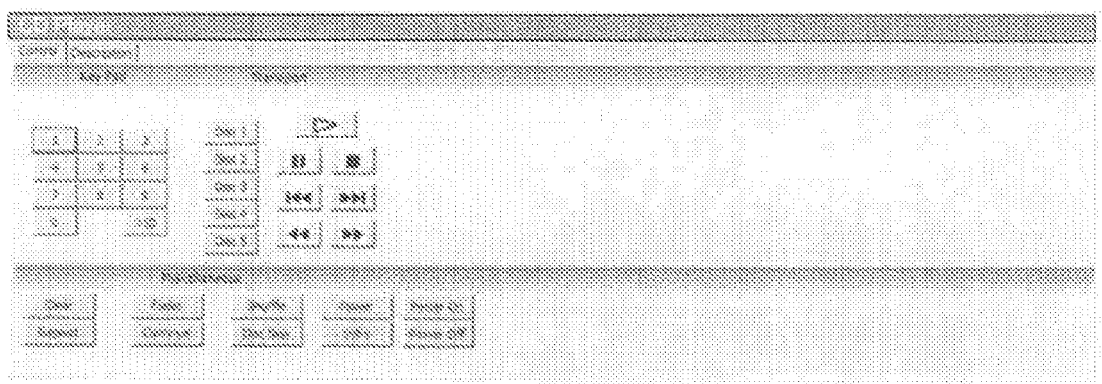

The user may add the new template component to the configuration. After saving the changes made to the template, the user may select "Configuration," and select the active configuration. The new template component may need to be added to the configuration by selecting it from the list of components. The component may populate in the list by friendly name. The system may require the definition of fields pertaining to the configuration file name and friendly name for logging purposes, as shown in FIG. 15(A). Usually standard 1:1 component; device configuration may be required. The exception to this rule may be when using a network adapter and multiple devices may be associated to the single component. The user can check the settings previously specified and then select "Save" to complete the configuration process, as shown in FIG. 15(B). To test the command catalogue, the user may select "Start" on the component and verify the service starts, and the device may be available in the Devices to test. The system may provide transport controls based on the set of commands configured, as shown in FIG. 15(C). The user may verify the performance of the device in order to identify any potential errors in setup. Then the user may now incorporate the devices into the CAS environment via scripting commands.

The methodologies described herein may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of client or device, and executed by a processor, for example a general-purpose processor. Memory may be implemented with the processor or external to the processor. As used herein the term "memory" refers to any type of long term, short term, volatile, nonvolatile, or other memory and is not to be limited to any particular type of memory or number of memories, or type of media upon which memory is stored.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A convergence and automation system, comprising:
an Internet Protocol (IP) based network and
a plurality of devices connected to the network, each device being configured to perform at least one operation;
at least one client connected to the network and configured to control at least a portion of the operations of the plurality of devices; and
a server connected to the network and configured to operate the convergence and automation system in accordance with a Web Services for Device (WSD) protocol,
wherein at least one of the server and the at least one client is configured with a control panel application allowing a user to configure and test the convergence and automation system,
wherein said control panel application is configured to allow the user to create, test, edit and delete a script of the convergence and automation system, to create and edit a trigger of the convergence and automation system, to create, edit and delete a schedule of the convergence and automation system, to start, stop and restart the operations of the devices, to create a template for the convergence and automation system and add the template to a configuration of the convergence and automation system,
wherein the WSD protocol comprises:
a first communication layer configured to logically interface the at least one client;
a second communication layer configured to physically interface the plurality of devices; and
a service provider layer comprising one or more components provided corresponding to one or more device categories, respectively, each component including at least one of the plurality of devices of the same device category, wherein each component comprises:
one or more Web Services provided corresponding to one or more of the plurality of devices of the corresponding device category, respectively, each Web Service configured to function as a Web Service host for the corresponding device;
one or more device bridges provided corresponding to the one or more Web Services, respectively, each device bridge configured to translate communication between the corresponding Web Service and device; and a controller configured to communicate with the one or more of the plurality of devices of the corresponding device category.

2. The convergence and automation system of claim 1, wherein each of said plurality of devices is selected from the group consisting of an audio device, video device, intercom device, lighting control device, security device and HVAC device.

3. The convergence and automation system of claim 1, wherein said at least one client is selected from the group consisting of a television, personal computer, personal data assistant and remote controller.

4. The convergence and automation system of claim 1, wherein said control panel application is configured to allow the user to create, edit, save, activate and delete the configuration for the convergence and automation system.

5. The convergence and automation system of claim 1, wherein said control panel application is configured to allow the user to add, edit and delete the component of the convergence and automation system.

6. The convergence and automation system of claim 1, wherein said control panel application is configured to allow the user to add, edit and delete a zone of the convergence and automation system.

7. The convergence and automation system of claim 1, wherein said control panel application is configured to allow the user to add, edit and delete a source of the convergence and automation system.

8. The convergence and automation system of claim 1, wherein said control panel application is configured to allow the user to add, discover, edit, delete, control a device of the convergence and automation system.

9. The convergence and automation system of claim 8, wherein said control panel is configured to allow the user to view manufacturer information of the devices.

10. The convergence and automation system of claim 1, wherein said control panel is configured to allow the user to add and edit a device control group of the convergence and automation system.

11. The convergence and automation system of claim 1, wherein said control panel is configured to allow the user to test the configuration of the convergence and automation system.

12. A machine readable non-transitory storage medium, comprising instructions, which, when executed by a processor, cause the processor to operate a convergence and automation system in accordance with a Web Services for Device (WSD) protocol, the convergence and automation system comprising an Internet Protocol (IP) based network and hardware connected to the network, wherein the hardware comprises:

a plurality of devices connected to the network, each device being configured to perform at least one operation;

at least one client connected to the network and configured to control at least a portion of the operations of the plurality of devices; and a server connected to the network and configured to operate the convergence and automation system according to the WSD protocol, wherein at least one of the server and the at least one client is configured with a control panel application allowing a user to configure and test the convergence and automation system, wherein said control panel application is configured to allow the user to create, test, edit and delete a script of the convergence and automation system, to create and edit a trigger of the convergence and automation system, to create, edit and delete a schedule of the convergence and automation system, to start, stop and restart the operations of the devices, to create a template for the convergence and automation system and add the template to a configuration of the convergence and automation system, wherein the WSD protocol comprises:

a first communication layer configured to logically interface the at least one client;

a second communication layer configured to physically interface the plurality of devices; and a service provider layer comprising one or more components provided corresponding to one or more device categories, respectively, each component including at least one of the plurality of devices of the same device category, wherein each component comprises:

one or more Web Services provided corresponding to one or more of the plurality of devices of the corresponding device category, respectively, each Web Service configured to function as a Web Service host for the corresponding device;

one or more device bridges provided corresponding to the one or more Web Services, respectively, each device bridge configured to translate communication between the corresponding Web Service and device; and a controller configured to communicate with the one or more of the plurality of devices of the corresponding device category.

13. The machine readable non-transitory medium of claim 12, wherein the instructions comprise:

instructions for receiving a first user input for configuring the convergence and automation system; and instructions for configuring the convergence and automation system in accordance with the first user input.

14. The machine readable non-transitory medium of claim 13, wherein the instructions further comprise:

instructions for receiving a second user input for testing the convergence and automation system; and instructions for testing the convergence and automation system when the second user input is received.

* * * * *